(12) United States Patent
Siomina et al.

(10) Patent No.: US 12,432,586 B2
(45) Date of Patent: Sep. 30, 2025

(54) METHODS FOR EFFICIENT RSTD MEASUREMENT REPORTING IN NR

(71) Applicant: Telefonaktiebolaget LM Ericsson (PUBL), Stockholm (SE)

(72) Inventors: Iana Siomina, Täby (SE); Muhammad Ali Kazmi, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 393 days.

(21) Appl. No.: 17/798,759

(22) PCT Filed: Feb. 8, 2021

(86) PCT No.: PCT/IB2021/051012
§ 371 (c)(1),
(2) Date: Aug. 10, 2022

(87) PCT Pub. No.: WO2021/161153
PCT Pub. Date: Aug. 19, 2021

(65) Prior Publication Data
US 2023/0110349 A1    Apr. 13, 2023

Related U.S. Application Data

(60) Provisional application No. 62/976,850, filed on Feb. 14, 2020, provisional application No. 62/975,404, filed on Feb. 12, 2020.

(51) Int. Cl.
*H04W 24/08*    (2009.01)
*H04W 24/10*    (2009.01)
(52) U.S. Cl.
CPC ........... *H04W 24/08* (2013.01); *H04W 24/10* (2013.01)

(58) Field of Classification Search
CPC ..... H04W 24/08; H04W 24/10; H04W 24/00; H04W 64/00; G01S 5/0009; G01S 2205/008
See application file for complete search history.

(56) References Cited

U.S. PATENT DOCUMENTS

2006/0056736 A1\* 3/2006 Lieberman ......... H04N 1/40068
  382/254
2014/0221005 A1\* 8/2014 Marshall ................. G01S 5/021
  455/456.1
(Continued)

FOREIGN PATENT DOCUMENTS

CN    108293240 A    7/2018
EP    3 354 047 B1    11/2019
(Continued)

OTHER PUBLICATIONS

PCT International Search Report issued for International application No. PCT/IB2021/051012—Apr. 28, 2021.
(Continued)

*Primary Examiner* — Rasheed Gidado
(74) *Attorney, Agent, or Firm* — Baker Botts L.L.P.

(57) ABSTRACT

According to certain embodiments, a method for use in a first node comprises receiving a first resolution factor (k) from a second node, adapting the first resolution factor (k) to obtain a second resolution factor (k'), and reporting a measurement to the second node according to the second resolution factor (k').

23 Claims, 12 Drawing Sheets

---

1101
Determining a resolution factor for reporting a measurement, the resolution factor determined based on selecting from a set of applicable resolution factor values obtained from a function that depends on the measurement, adapting a resolution factor k received from another node, or both.

1102
Reporting the measurement to a second node according to the resolution factor.

(56) References Cited

U.S. PATENT DOCUMENTS

2019/0104431 A1* 4/2019 Gunnarsson ........ H04L 25/0226
2019/0141554 A1* 5/2019 Siomina .............. H04W 64/003

FOREIGN PATENT DOCUMENTS

| WO | 2017 065674 A1 | 4/2017 |
| WO | 2017 078610 A1 | 5/2017 |
| WO | 2019 032004 A1 | 2/2019 |

OTHER PUBLICATIONS

PCT Written Opinion of the International Searching Authority issued for International application No. PCT/IB2021/051012—Apr. 28, 2021.
3GPP TSG-RAN WG4 Meeting #92bis; Chongqing, China; Source: CATT; Title: Discussion on UE Rx-Tx Time Different Measurement Report Mapping (R4-1910967)—Oct. 14-18, 2019.
3GPP TSG-RAN WG4 Meeting #93; Reno, USA; Source: CATT; title: Discussion on RSTD Measurement Report Mapping (R4-1913719)—Nov. 18-22, 2019.
Notice of Reasons for Rejection issued for Japanese Application Serial No. 2022-548963—Oct. 31, 2023.
Notice of First Review issued for Chinese Patent Application Serial No. 202180027956.9—Aug. 7, 2024.
Search Report issued for Chinese Patent Application Serial No. 2021800279569—Aug. 5, 2024.
Communication pursuant to Article 94(3) EPC with examination report in EP Application No. 21 704 954.3-1215, dated Aug. 12, 2024.

* cited by examiner

METHODS FOR EFFICIENT RSTD MEASUREMENT REPORTING IN NR

PRIORITY

This nonprovisional application is a U.S. National Stage Filing under 35 U.S.C. § 371 of International Patent Application Serial No. PCT/IB2021/051012 filed Feb. 8, 2021 and entitled "METHODS FOR EFFICIENT RSTD MEASUREMENT REPORTING IN NR" which claims priority to U.S. Provisional Patent Application No. 62/975,404 filed Feb. 12, 2020 and U.S. Provisional Patent Application No. 62/976,850 filed Feb. 14, 2020, all of which are hereby incorporated by reference in their entirety.

BACKGROUND

1.1 Positioning in New Radio (NR)

The Third Generation Partnerships Project (3GPP) comprises a partnership of organizations involved in the development of telecommunications standards, such as Long Term Evolution (LTE) standards and New Radio (NR) standards, among others. 3GPP is currently discussing the architecture for NR (also known as the $5^{th}$ Generation (5G) or Next Generation architecture). FIG. 1 illustrates the current concept for the NR architecture according to 3GPP Technical Specification (TS) 38.300. The NR architecture includes NR base stations (BSs), denoted as gNB and ng-eNB (or evolved eNB) in FIG. 1. One NR BS may correspond to one or more transmission/reception points (TRPs). In FIG. 1, the lines between the nodes illustrate the corresponding interfaces. Note that although FIG. 1 illustrates the gNB and ng-eNB, the gNB and ng-eNB need not always both be present. Also note that when both the gNB and ng-eNB are present, the NG-C interface is only present for one of them.

The location node in NR is the Location Management Function (LMF). The LMF may interact with the gNB via the NR Positioning Protocol A (NRPPa) (not illustrated in FIG. 1). The LMF may interact with a user equipment (UE) and with a location server (e.g., Evolved-Serving Mobile Location Centre (E-SMLC)) via the NR LTE Positioning Protocol (NR LPP). The interactions between the gNB and the UE are supported via the Radio Resource Control (RRC) protocol.

1.2 NR Positioning Measurements

The positioning methods and measurements currently being discussed for 3GPP Release 16 (Rel-16 or Rel.16) NR can be summarized in Tables 1-2. For reference, the acronyms in these tables refer to Angle-of-Arrival (AoA), Angle-of-Departure (AoD), Channel State Information Reference Signal (CSI-RS), Downlink (DL), Enhanced Cell Identifier (E-CID), Positioning Reference Signal (PRS), Radio Resource Management (RRM), Receive (Rx), Reference Signal Received Power (RSRP), Reference Signal Received Power per Branch (RSRPB), Reference Signal Received Quality (RSRQ), Reference Signal Time Difference (RSTD), Relative Time of Arrival (RTOA), Round Trip Time (RTT), Sounding Reference Signal (SRS), Synchronization Signal (SS), Time Difference of Arrival (TDOA), Transmit (Tx), Uplink (UL), and Zenith angle of Arrival (ZoA).

TABLE 1

Positioning Methods and UE Measurements discussed for 3GPP Rel-16

| DL/UL Reference Signals | UE Measurements | To facilitate support of the following positioning techniques |
|---|---|---|
| Rel. 16 DL PRS | DL RSTD | DL-TDOA |
| Rel. 16 DL PRS | DL PRS RSRP | DL-TDOA, DL-AoD, Multi-RTT |
| Rel. 16 DL PRS/ Rel. 16 SRS for positioning | UE Rx-Tx time difference | Multi-RTT |
| Rel. 15 SSB/ CSI-RS for RRM | SS-RSRP (RSRP for RRM), SS-RSRQ (for RRM), CSI-RSRP (for RRM), CSI-RSRQ (for RRM), SS-RSRPB (for RRM) | E-CID |

TABLE 2

Positioning Methods and gNB Measurements discussed for 3GPP Rel-16

| DL/UL Reference Signals | gNB Measurements | To facilitate support of the following positioning techniques |
|---|---|---|
| Rel. 16 SRS for positioning | UL RTOA | UL-TDOA |
| Rel. 16 SRS for positioning | UL SRS-RSRP | UL-TDOA, UL-AoA, Multi-RTT |
| Rel. 16 SRS for positioning, Rel. 16 DL PRS | gNB Rx-Tx time difference | Multi-RTT |
| Rel. 16 SRS for positioning, | AoA and ZoA | UL-AoA, Multi-RTT |

1.3 Timing Measurement Report Mapping

1.3.1 Long Term Evolution (LTE)

In LTE, the step size for timing measurement reporting is pre-defined by the standard. For example, for UE reception-transmission (Rx-Tx) in frequency division duplexing (FDD), the measurement report mapping is given by the reporting range defined from 0 to 20472 Ts (corresponds to RX-TX_TIME_DIFFERENCE_0000 and RX-TX_TIME_DIFFERENCE_4095 as minimum and maximum reported quantities, respectively), with a 2 Ts resolution for UE Rx-Tx time difference less than 4096 Ts and an 8 Ts resolution for UE Rx-Tx time difference equal to or greater than 4096 Ts (where Ts refers to a time unit).

TABLE 3

LTE UE Rx-Tx measurement report mapping in FDD.

| Reported value | Measured quantity value | Unit |
|---|---|---|
| RX-TX_TIME_DIFFERENCE_0000 | $T_{UE\ Rx\text{-}Tx} < 2$ | Ts |
| RX-TX_TIME_DIFFERENCE_0001 | $2 \leq T_{UE\ Rx\text{-}Tx} < 4$ | Ts |
| RX-TX_TIME_DIFFERENCE_0002 | $4 \leq T_{UE\ Rx\text{-}Tx} < 6$ | Ts |
| ... | ... | ... |
| RX-TX_TIME_DIFFERENCE_2046 | $4092 \leq T_{UE\ Rx\text{-}Tx} < 4094$ | Ts |
| RX-TX_TIME_DIFFERENCE_2047 | $4094 \leq T_{UE\ Rx\text{-}Tx} < 4096$ | Ts |
| RX-TX_TIME_DIFFERENCE_2048 | $4096 \leq T_{UE\ Rx\text{-}Tx} < 4104$ | Ts |
| RX-TX_TIME_DIFFERENCE_2049 | $4104 \leq T_{UE\ Rx\text{-}Tx} < 4112$ | Ts |
| ... | ... | ... |
| RX-TX_TIME_DIFFERENCE_4093 | $20456 \leq T_{UE\ Rx\text{-}Tx} < 20464$ | Ts |
| RX-TX_TIME_DIFFERENCE_4094 | $20464 \leq T_{UE\ Rx\text{-}Tx} < 20472$ | Ts |
| RX-TX_TIME_DIFFERENCE_4095 | $20472 \leq T_{UE\ Rx\text{-}Tx}$ | Ts |

Similarly, for RSTD, the measurement report mapping for coarse reporting is according to Table 4. In Rel-14, higher-resolution reporting was also introduced as in Table 5, for which the UE reports a reference quantity from Table 4 and a relative quantity from Table 5, so that the difference between the measurement exceeds the lower bound of the reported reference range from Table 4 by no more than the relative quantity+resolutionStep.

TABLE 4 reference quantities reported for RSTD

| Reported Reference Value | Measured Quantity Value | Unit |
|---|---|---|
| RSTD_0000 | −15391 > RSTD | Ts |
| RSTD_0001 | −15391 ≤ RSTD < −15386 | Ts |
| ... | ... | ... |
| RSTD_2258 | −4106 ≤ RSTD < −4101 | Ts |
| RSTD_2259 | −4101 ≤ RSTD < −4096 | Ts |
| RSTD_2260 | −4096 ≤ RSTD < −4095 | Ts |
| RSTD_2261 | −4095 ≤ RSTD < −4094 | Ts |
| ... | ... | ... |
| RSTD_6353 | −3 ≤ RSTD < −2 | Ts |
| RSTD_6354 | −2 ≤ RSTD < −1 | Ts |
| RSTD_6355 | −1 ≤ RSTD ≤ 0 | Ts |
| RSTD_6356 | 0 < RSTD ≤ 1 | Ts |
| RSTD_6357 | 1 < RSTD ≤ 2 | Ts |
| RSTD_6358 | 2 < RSTD ≤ 3 | Ts |
| ... | ... | ... |
| RSTD_10450 | 4094 < RSTD ≤ 4095 | Ts |
| RSTD_10451 | 4095 < RSTD ≤ 4096 | Ts |
| RSTD_10452 | 4096 < RSTD ≤ 4101 | Ts |
| RSTD_10453 | 4101 < RSTD ≤ 4106 | Ts |
| ... | ... | ... |
| RSTD_12709 | 15381 < RSTD ≤ 15386 | Ts |
| RSTD_12710 | 15386 < RSTD ≤ 15391 | Ts |
| RSTD_12711 | 15391 < RSTD | Ts |

TABLE 5 relative quantities reported for RSTD

| Reported Relative Quantity Value | Measured Relative Quantity Value, $\Delta_{RSTD}$ | Unit |
|---|---|---|
| RSTD_delta_0 | 0 | Ts |
| RSTD_delta_1 | 0.5 | Ts |
| RSTD_delta_2 | 1.0 | Ts |
| RSTD_delta_3 | 2.0 | Ts |
| RSTD_delta_4 | 3.0 | Ts |
| RSTD_delta_5 | 4.0 | Ts |

For NR, it was agreed that the measurement reporting mapping step or resolution is configurable, but no other details are settled:

The reporting granularity for the UE/gNB timing measurements, such as DL RSTD, the UE Rx-Tx time difference, UL RTOA, and gNB Rx-Tx time difference, is defined as $2^k$ Tc, where k is a configuration parameter with a minimum value of at most 0. For example k=0, 1, 2, 3, 4, or 5, and for k=0, granularity=1 Tc; for k=1, granularity=2 Tc, and so on. Tc is the basic time unit in NR; 1 Tc=1/64*32.55 ns (approximately 0.51 ns).

Note: RAN4 can determine if −1 can be a minimum value

Radio Access Network Working Group 1 (RAN1) assumes that the details of the reporting granularity and ranges for the UE/gNB timing measurements (e.g., DL RTSD, the UE Rx-Tx time difference, UL RTOA, gNB Rx-Tx time difference) will be determined by Radio Access Network Working Group 4 (RAN4), including the potential relation of the parameter k to DL PRS bandwidth.

SUMMARY

There currently exist certain challenge(s). As an example of a challenge that currently exists, the measurement report mapping has not yet been decided in NR. Incorporating the configurable measurement report mapping step into the legacy measurement report mapping approach is not straightforward. Designing measurement report mapping based on the smallest configurable step (1 Tc which is 1/64 Ts) is not efficient since this leads to ~50000 reportable values for a single measurement and would require 16 bits to encode the measurement. In addition, this approach would not be consistent with the high-resolution mapping in LTE. As another example of a challenge that currently exists, sometimes the UE may not be able to apply the measurement report mapping step configured by the network, e.g., beyond the measurement accuracy or beyond the allowed step values depending on the measurement value (e.g., a smaller step may be required for measurement values below a threshold and a larger step may be required for measurement values above the threshold, while the network may be not aware of the measurement values, etc.).

Certain aspects of the present disclosure and their embodiments may provide solutions to these or other challenges. For example, certain embodiments provide methods in which a measuring node determines a resolution factor value. There are, proposed herein, various embodiments which address one or more of the issues disclosed herein.

According to a first embodiment, a measuring node determines a set of applicable resolution factor values based on a function depending at least on the measured quantity and possibly also on one or more of: the frequency range (FR) (e.g., different sets of applicable resolution factors are determined for FR1 and FR2) in which the measurement is performed, the corresponding reference quantity, measurement purpose, serving or non-serving cell, positioning method, etc.

In one specific example, the function F is a logical function $F=(k\varepsilon[k_{min}, k_{max}])$, which is true when k belongs to the indicated range $[k_{min}, k_{max}]$ and false otherwise.

In another specific example, the function $F=\text{mod}(\Delta_{RSTD}, 2^k)$ where $k\varepsilon[k_{min1}, k_{max}]$ is the resolution factor, and the set of applicable resolution factors k comprises any k in $[k_{min}, k_{max}]$ satisfying $\text{mod}(\Delta_{RSTD}, 2^k)=0$, where $\Delta_{RSTD}$ is the measured relative quantity.

In some examples, $k_{min}$ and $k_{max}$ may be pre-defined and fixed or may depend on one or more of: measurement frequency range, reference measurement quantity, measurement purpose, serving or non-serving cell, positioning method, etc.

According to a second embodiment, a measuring node receives a resolution factor k from another node and further adapts it to obtain a resolution factor k' to be used for its measurement report mapping. In some examples, the measuring node may also implicitly or explicitly indicate to the other node the k' used for the measurement reporting.

According to a third embodiment, the first and the second embodiments are combined, e.g., measuring node receives a resolution factor k from a network node, determines the set of the applicable resolution factor values, and adapts to obtain k'.

In one example, based on the determining result, if k is not in the set of the applicable values, the measuring node may further adapt the resolution factor to obtain a resolution factor k' from the set of the applicable values.

In another example, the measuring node receives k and adapts it (regardless of whether k is within the set of applicable values) to obtain k' from the set of the applicable values.

The embodiments above are described primarily for RSTD, but may also apply for other measurements, e.g.: UE Rx-Tx time difference measurement, gNB Rx-Tx time difference measurement, timing advance (TA) type 1, TA type 2, RTT measurement, absolute or relative TOA measurement, UL RTOA measurement, a unidirectional (DL or UL) or bidirectional timing measurement, a measurement for positioning, etc. For a unidirectional DL measurement (e.g., RSTD) the measuring node is UE; for unidirectional UL measurement (e.g., UL RTOA) the measuring node is radio network node (e.g., gNB, TRP, or base station). A bidirectional measurement may be performed by the UE or by a radio network node.

According to certain embodiments, a method for use in a first node (measuring node) comprises receiving a first resolution factor (k) from a second node, adapting the first resolution factor (k) to obtain a second resolution factor (k'), and reporting a measurement to the second node according to the second resolution factor (k').

According to certain embodiments, a first node (measuring node) comprises power supply circuitry and processing circuitry. The power supply circuitry is configured to supply power to the first node. The processing circuitry is configured to receive a first resolution factor (k) from a second node, adapt the first resolution factor (k) to obtain a second resolution factor (k'), and report a measurement to the second node according to the second resolution factor (k').

According to certain embodiments, a method performed by a second node comprises sending a first resolution factor (k) to a first node and receiving a measurement from the first node according to a second resolution factor (k'), the second resolution factor (k') obtained by the first node by adapting the first resolution factor (k).

According to certain embodiments, a second node comprises power supply circuitry and processing circuitry. The power supply circuitry is configured to supply power to the second node. The processing circuitry is configured to send a first resolution factor (k) to a first node and receive a measurement from the first node according to a second resolution factor (k'), the second resolution factor (k') obtained by the first node by adapting the first resolution factor (k).

The above-described first node, second node, method in a first node, and/or method in a second node may support additional features, such as one or more of the following features:

In some embodiments, the second resolution factor (k') is indicated from the first node to the second node. In some embodiments the second resolution factor (k') is indicated implicitly. In other embodiments, the second resolution factor (k') is indicated explicitly.

In some embodiments, the first resolution factor (k) indicates a reporting granularity for timing measurements.

In some embodiments, adapting the first resolution factor (k) comprises determining a set of applicable values and selecting an applicable value from the set of applicable values as the second resolution factor (k'). As an example, the selected applicable value can be the closest to the first resolution factor (k) out of those of the set of applicable values that are less than the first resolution factor (k). As another example, the selected applicable value can be closest to the first resolution factor (k) out of those of the set of applicable values that are greater than the first resolution factor (k).

In certain embodiments, determining the set of applicable values is based on a function that depends at least in part on a measured value. In some embodiments, the function further depends on one or more of: an FR in which the measurement is performed, a reference quantity, a measurement purpose, whether a cell in which the measurement is performed is a serving cell or a non-serving cell, and/or a positioning method. In some embodiments, the function comprises $F=(k\varepsilon[k_{min}, k_{max}])$, which is true when the applicable value belongs to the indicated range $[k_{min}, k_{max}]$ and false otherwise.

According to certain embodiments, a computer program comprises instructions that when executed on a computer perform any of the steps of any of the above-described methods.

According to certain embodiments, a computer program product comprises a computer program. The computer program comprising instructions that when executed on a computer perform any of the steps of any of the above-described methods.

According to certain embodiments, a non-transitory computer-readable storage medium or carrier comprises a computer program. The computer program comprises instructions that when executed on a computer perform any of the steps of any of the above-described methods.

Certain embodiments may provide one or more of the following technical advantage(s). Certain embodiments provide a possibility for a more flexible and efficient measurement report mapping for timing measurements. Certain embodiments provide a possibility to incorporate the configurable resolution factor into the legacy approach. Certain embodiments provide the possibility for the UE to further adapt the resolution factor.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
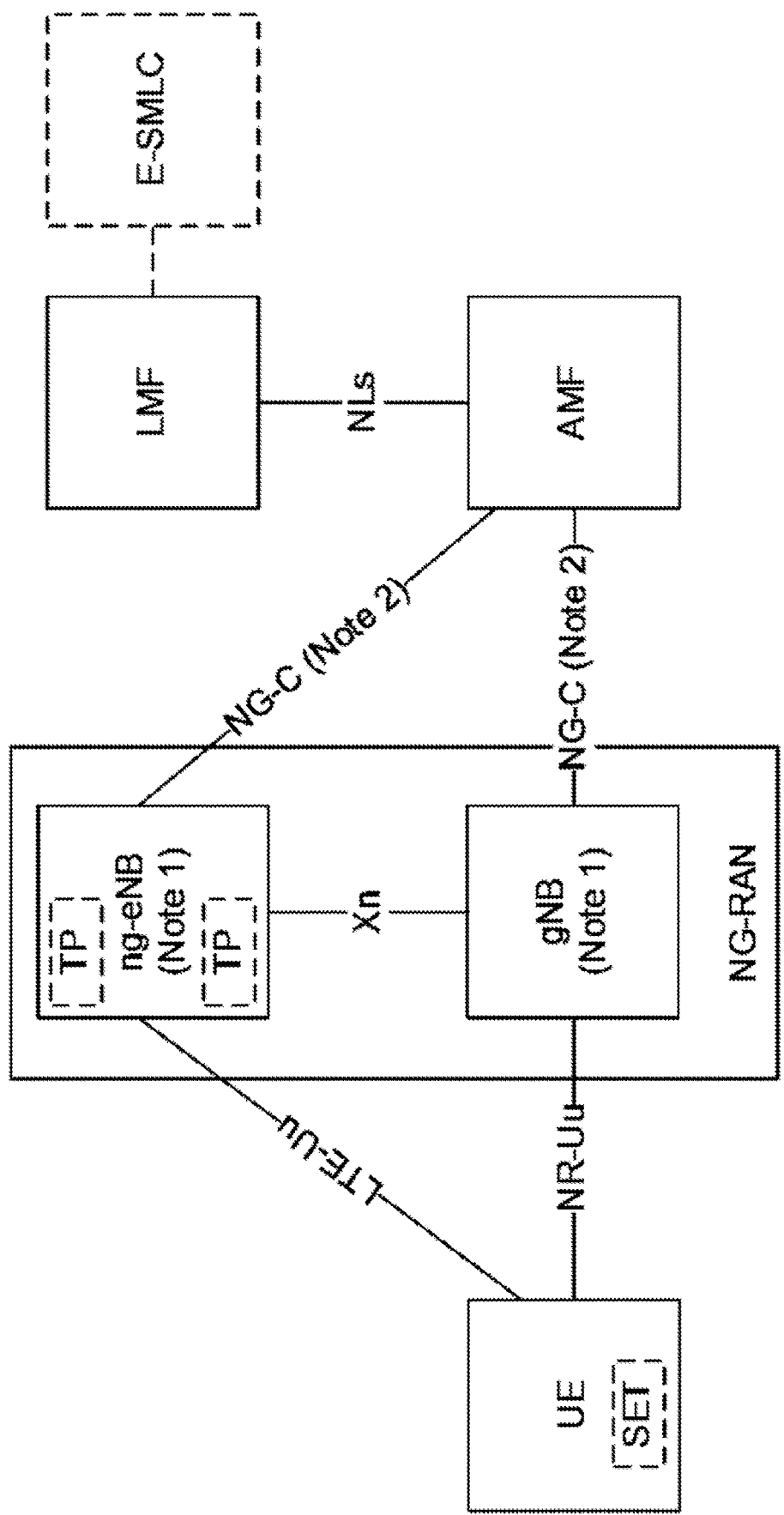
FIG. 1 illustrates an example of an NR architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

2.1 Methods to Determine A Set of Applicable Resolution Factor Values

According to a first embodiment, a measuring node determines a set of applicable resolution factor values based on a function F depending at least on the measured quantity and possibly also on one or more of: the frequency range (FR) (e.g., different sets of applicable resolution factors are determined for FR1, FR2, FR3, etc.) in which the measurement is performed, the corresponding reference quantity, measurement purpose, serving or non-serving cell, positioning method, etc. The applicable resolution factor values based on the function F further depend on a combination of FRs used for the RSTD measurement, e.g., FR of reference cell and FR of neighbor cell used for RSTD. Different FRs may each comprise a certain set of frequencies. As an example of FR1, in certain embodiments FR1 comprises frequencies between 400 MHz to 6 GHz. As another example of FR1, in certain embodiments FR1 comprises frequencies between 400 MHz to 7 GHz. As an example of FR2, in certain embodiments FR2 comprises frequencies between 24 GHz to 52.6 GHz. As an example of FR3, in certain embodiments, FR3 comprises frequencies beyond 52.6 GHz. As another example of FR3, in certain embodiments F3 comprises frequencies between 52.6 GHz and 71 GHz.

- In one example, the function F is a logical function $F=(k\varepsilon[k_{min}, k_{max}])$, which is true when k belongs to the indicated range $[k_{min}, k_{max}]$ and false otherwise.
- In another example, the function $F=mod(\Delta_{RSTD}, 2^k)$ where $k\varepsilon[k_{min}, k_{max}]$ is the resolution factor, and the set of applicable resolution factors k comprises any k in $[k_{min}, k_{max}]$ satisfying $mod(\Delta_{RSTD}, 2^k)=0$, where $\Delta_{RSTD}$ is the measured relative quantity.
- In yet another example, F is any condition determining the applicability of k.
- In yet another example, F is any additional condition determining the applicability of k in addition to that $k\varepsilon[k_{min}, k_{max}]$.
- In yet another example the applicable set of the resolution factor values depend on the FR of the cells involved in the RSTD measurements, for example, k=k1 for FR1, where k1={3, 4 and 5} while k=k2 for FR2 where k2={0, 1, 2 3, 4 and 5}.
- In yet another example the applicable set (kc) of resolution factor values when reference cell and neighbor cell belong to different FRs is derived based on a function (H) of sets of resolution factor values of the two FRs. Examples of the function H are subset, superset, common set of values, etc. In one specific example k=kc where kc=k1○k2. The function further depends on the relation between FRs of reference cell and neighbor cell. This is explained with examples: In one specific example kc=k1○k2 if the reference cell belongs to FR1 while the neighbor cell belongs to FR2. In another specific example kc=k1○k2 if the reference cell belongs to FR2 while the neighbor cell belongs to FR1.
In some examples, $k_{min}$ and $k_{max}$ may be pre-defined and fixed or may be determined by on one or more of.

Measuring node reporting capability (e.g., $k_{min}$ and $k_{max}$ are comprised in the set of resolution factors supported by the measuring node and in one example are the minimum and the maximum supported resolution factors, respectively), In some examples, the measuring node reporting capability may also be provided to another node, which can use this for configuring measurement and/or measurement reporting for the measuring node measurement frequency range (e.g., a larger $k_{min}$ for FR1 than for FR2), reference quantity (e.g., $k_{min}=k_{min1}$ when reference quantity≤threshold or abs(reference quantity) ≤threshold, and $k_{min}=k_{min2}>k_{min1}$ when reference quantity >threshold or abs(reference quantity) > threshold; or $k_{min}=k_{min1}$ when reference quantity belongs to a first part of the measurement report mapping table, and $k_{min}=k_{min2}$ when reference quantity belongs to a second part of the measurement report mapping table), serving or non-serving cell (e.g., a smaller $k_{min}$ and/or smaller $k_{max}$ for the serving cell than for a non-serving cell), measurement purpose and/or positioning method (e.g., a larger $k_{min}$ and/or larger $k_{max}$ for the Rx-Tx measurement with multi-RTT involving neighbor cell than for a serving cell based Rx-Tx measurement for positioning or other purpose), etc.

The determined applicable set of resolution factor values is then used to select an applicable resolution factor value for measurement report mapping to report a measurement by the measuring node to another node (e.g., positioning node or another radio network node, TRP, or base station, or another UE), which may (in one example) or may not (in another example) be the node configuring the measurement in the measuring node (e.g., by providing a measurement configuration or assistance data to the measuring node).

In one example, the UE may need to determine a set of applicable values and select one applicable resolution factor value for reporting, when the UE is not configured with k by a network node (e.g., positioning node or radio network node such as gNB, base station or TRP). In another example, the UE may need to determine a set of applicable values, at least in some cases (e.g., k beyond UE capability or k may not satisfy function F, etc.) even when k is configured by a network node.

The reported measurement quantity may be required to be always based on an applicable resolution factor value.

2.1.1 a Specific Example for RSTD with Explicit Function F

For purposes of explanation, the following provides an example of the first embodiment described in Section 2.1 using specific $k_{min}$ and $k_{max}$ values for a specific measurement type (RSTD). The first embodiment is not limited to this example scenario. Other examples of the first embodiment may use different $k_{min}$ values, different $k_{max}$ values, and/or different measurement types.

According to certain embodiments, to report an RSTD measurement, the UE shall report a reference quantity value based on Table 6 and a relative quantity value $\Delta_{RSTD}$ defined in Table 7, so that the difference between the measured RSTD quantity and the lower bound of the corresponding range from Table 6 is between $\Delta_{RSTD}$ and $\Delta_{RSTD}$+resolution-Step.

In one example the resolutionStep is $2^k$, where k shall be an applicable value satisfying $k_{min}$, ≤k≤$k_{max}$ and mod $(\Delta_{RSTD}, 2^k)=0$, with
$k_{max}=5$,
$k_{min}=4$ for FR1 when RSTD_delta_i is reported together with a reference quantity from RSTD_2260 to RSTD_10451,
$k_{min}=5$ for FR1 when RSTD_delta_i is reported together with a reference quantity from RSTD_0000 to RSTD_2259 or from RSTD_10452 to RSTD_12711,
$k_{min}=0$ for FR2 when RSTD_delta_i is reported together with a reference quantity from RSTD_2260 to RSTD_10451,
$k_{min}=4$ for FR2 when RSTD_delta_i is reported together with a reference quantity from RSTD_0000 to RSTD_2259 or from RSTD_10452 to RSTD_12711.

In another example the resolutionStep is $2^k$, where k=k1 if reference and neighbour cells belong to FR1 and k=k2 if reference and neighbour cells belong to FR2, where at least some of the values in sets k1 and k2 are different. As an example, k1={3, 4 and 5} and k2={0, 1, 2, 3, 4 and 5}. In another example, $k_{min}$=max($k_{min}$, FR1, $k_{min}$, FR2) and/or $k_{max}$=min($k_{max}$, FR1, $k_{max}$, FR2) when the reference and neighbour cells belong to different FRs, and the set of feasible k-values will then be determined $k_{min}$ and $k_{max}$.

In yet another example the resolutionStep is $2^k$, where k=kc if reference and neighbour cells belong to FR1 and FR2 respectively or FR2 and FR1 respectively. As an example, kc=k1○k2.

The mapping between the measured quantity and the reported reference quantity values is defined in Table 6. The reporting range of the reference RSTD is defined from −15391 Ts to 15391 $T_s$ with 1 $T_s$ resolution for absolute value of RSTD less or equal to 4096 $T_s$ and 5 $T_s$ for absolute value of RSTD greater than 4096 $T_s$, where $T_s$ is defined in TS 38.211 [6].

TABLE 6

Reference quantity report mapping

| Reported Reference Quantity Value | Measured Quantity Value | Unit |
|---|---|---|
| RSTD_0000 | −15391 > RSTD | Ts |
| RSTD_0001 | −15391 ≤ RSTD < −15386 | Ts |
| . . . | . . . | . . . |
| RSTD_2258 | −4106 ≤ RSTD < −4101 | Ts |
| RSTD_2259 | −4101 ≤ RSTD < −4096 | Ts |
| RSTD_2260 | −4096 ≤ RSTD < −4095 | Ts |
| RSTD_2261 | −4095 ≤ RSTD < −4094 | Ts |
| . . . | . . . | . . . |
| RSTD_6353 | −3 ≤ RSTD < −2 | Ts |
| RSTD_6354 | −2 ≤ RSTD < −1 | Ts |
| RSTD_6355 | −1 ≤ RSTD ≤ 0 | Ts |
| RSTD_6356 | 0 < RSTD ≤ 1 | Ts |
| RSTD_6357 | 1 < RSTD ≤ 2 | Ts |
| RSTD_6358 | 2 < RSTD ≤ 3 | Ts |
| . . . | . . . | . . . |
| RSTD_10450 | 4094 < RSTD ≤ 4095 | Ts |
| RSTD_10451 | 4095 < RSTD ≤ 4096 | Ts |
| RSTD_10452 | 4096 < RSTD ≤ 4101 | Ts |
| RSTD_10453 | 4101 < RSTD ≤ 4106 | Ts |
| . . . | . . . | . . . |

TABLE 6-continued

Reference quantity report mapping

| Reported Reference Quantity Value | Measured Quantity Value | Unit |
|---|---|---|
| RSTD_12709 | 15381 < RSTD ≤ 15386 | Ts |
| RSTD_12710 | 15386 < RSTD ≤ 15391 | Ts |
| RSTD12711 | 15391 < RSTD | Ts |

Table 7 defines the mapping between the measured relative quantity and the reported relative quantity values.

TABLE 7

Relative quantity report mapping

| Reported Relative Quantity Value | Measured Relative Quantity Value, $\Delta_{RSTD}$ | Unit |
|---|---|---|
| RSTD_delta_0 | 0 | Tc |
| RSTD_delta_1 | 1 | Tc |
| RSTD_delta_2 | 2 | Tc |
| ... | ... | ... |
| RSTD_delta_63 | 63 | Tc |
| RSTD_delta_64 | 64 | Tc |
| RSTD_delta_65 | 80 | Tc |
| RSTD_delta_66 | 96 | Tc |
| RSTD_delta_67 | 112 | Tc |
| RSTD_delta_68 | 128 | Tc |
| RSTD_delta_69 | 144 | Tc |
| RSTD_delta_70 | 160 | Tc |
| RSTD_delta_71 | 176 | Tc |
| RSTD_delta_72 | 192 | Tc |
| RSTD_delta_73 | 208 | Tc |
| RSTD_delta_74 | 224 | Tc |
| RSTD_delta_75 | 240 | Tc |
| RSTD_delta_76 | 256 | Tc |
| RSTD_delta_77 | 272 | Tc |
| RSTD_delta_78 | 288 | Tc |
| RSTD_delta_79 | 304 | Tc |

2.1.2 A Specific Example for RSTD with Implicit Function F

This example is the same as with the explicit function F above, except that function F is not explicitly stated in the text, but rather the results of the function F (the list of the corresponding applicable resolution factors) are merged into the corresponding Table 8 which would replace Table 7. For reference, the column headings in Table 8 refer to the following:

"Column 1" refers to when RSTD_delta_i is reported together with RSTD_2260 . . . RSTD_10451;

"Column 2" refers to when RSTD_delta_i is reported together with RSTD_0000 . . . RSTD_2259 or RSTD_10452 . . . RSTD_12711;

"Column 3" refers to when RSTD_delta_i is reported together with RSTD_2260 . . . RSTD_10451; and "Column 4" refers to when RSTD_delta_i is reported together with RSTD_0000 . . . RSTD_2259 or RSTD_10452 . . . RSTD_12711.

TABLE 8

Relative quantity report mapping with the list of applicable resolution factors derived based on function F

| Reported Relative Quantity Value | Measured Relative Quantity Value, $\Delta_{RSTD}$ | Unit | Applicable resolution factor k | | | |
|---|---|---|---|---|---|---|
| | | | FR1 | | FR2 | |
| | | | Column 1 | Column 2 | Column 3 | Column 4 |
| RSTD_delta_0 | 0 | $T_c$ | 4, 5 | 5 | 0, 1, 2, 3, 4, 5 | 4, 5 |
| RSTD_delta_1 | 1 | $T_c$ | — | — | 0 | — |
| RSTD_delta_2 | 2 | $T_c$ | — | — | 0, 1 | — |
| RSTD_delta_3 | 3 | $T_c$ | — | — | 0 | — |
| RSTD_delta_4 | 4 | $T_c$ | — | — | 0, 1, 2 | — |
| RSTD_delta_5 | 5 | $T_c$ | — | — | 0 | — |
| RSTD_delta_6 | 6 | $T_c$ | — | — | 0, 1 | — |
| RSTD_delta_7 | 7 | $T_c$ | — | — | 0 | — |
| RSTD_delta_8 | 8 | $T_c$ | — | — | 0, 1, 2, 3 | — |
| RSTD_delta_9 | 9 | $T_c$ | — | — | 0 | — |
| RSTD_delta_10 | 10 | $T_c$ | — | — | 0, 1 | — |
| RSTD_delta_11 | 11 | $T_c$ | — | — | 0 | — |
| RSTD_delta_12 | 12 | $T_c$ | — | — | 0, 1, 2 | — |
| RSTD_delta_13 | 13 | $T_c$ | — | — | 0 | — |
| RSTD_delta_14 | 14 | $T_c$ | — | — | 0, 1 | — |
| RSTD_delta_15 | 15 | $T_c$ | — | — | 0 | — |
| RSTD_delta_16 | 16 | $T_c$ | 4 | — | 0, 1, 2, 3, 4 | 4 |
| RSTD_delta_17 | 17 | $T_c$ | — | — | 0 | — |
| RSTD_delta_18 | 18 | $T_c$ | — | — | 0, 1 | — |
| RSTD_delta_19 | 19 | $T_c$ | — | — | 0 | — |
| RSTD_delta_20 | 20 | $T_c$ | — | — | 0, 1, 2 | — |
| RSTD_delta_21 | 21 | $T_c$ | — | — | 0 | — |
| RSTD_delta_22 | 22 | $T_c$ | — | — | 0, 1 | — |
| RSTD_delta_23 | 23 | $T_c$ | — | — | 0 | — |
| RSTD_delta_24 | 24 | $T_c$ | — | — | 0, 1, 2, 3 | — |
| RSTD_delta_25 | 25 | $T_c$ | — | — | 0 | — |

TABLE 8-continued

Relative quantity report mapping with the list of applicable resolution factors derived based on function F

| Reported Relative Quantity Value | Measured Relative Quantity Value, $\Delta_{RSTD}$ | Unit | Applicable resolution factor k | | | |
|---|---|---|---|---|---|---|
| | | | FR1 | | FR2 | |
| | | | Column 1 | Column 2 | Column 3 | Column 4 |
| RSTD_delta_26 | 26 | $T_c$ | — | — | 0, 1 | — |
| RSTD_delta_27 | 27 | $T_c$ | — | — | 0 | — |
| RSTD_delta_28 | 28 | $T_c$ | — | — | 0, 1, 2 | — |
| RSTD_delta_29 | 29 | $T_c$ | — | — | 0 | — |
| RSTD_delta_30 | 30 | $T_c$ | — | — | 0, 1 | — |
| RSTD_delta_31 | 31 | $T_c$ | — | — | 0 | — |
| RSTD_delta_32 | 32 | $T_c$ | 4, 5 | 5 | 0, 1, 2, 3, 4, 5 | 4, 5 |
| RSTD_delta_33 | 33 | $T_c$ | — | — | 0 | — |
| RSTD_delta_34 | 34 | $T_c$ | — | — | 0, 1 | — |
| RSTD_delta_35 | 35 | $T_c$ | — | — | 0 | — |
| RSTD_delta_36 | 36 | $T_c$ | — | — | 0, 1, 2 | — |
| RSTD_delta_37 | 37 | $T_c$ | — | — | 0 | — |
| RSTD_delta_38 | 38 | $T_c$ | — | — | 0, 1 | — |
| RSTD_delta_39 | 39 | $T_c$ | — | — | 0 | — |
| RSTD_delta_40 | 40 | $T_c$ | — | — | 0, 1, 2, 3 | — |
| RSTD_delta_41 | 41 | $T_c$ | — | — | 0 | — |
| RSTD_delta_42 | 42 | $T_c$ | — | — | 0, 1 | — |
| RSTD_delta_43 | 43 | $T_c$ | — | — | 0 | — |
| RSTD_delta_44 | 44 | $T_c$ | — | — | 0, 1, 2 | — |
| RSTD_delta_45 | 45 | $T_c$ | — | — | 0 | — |
| RSTD_delta_46 | 46 | $T_c$ | — | — | 0, 1 | — |
| RSTD_delta_47 | 47 | $T_c$ | — | — | 0 | — |
| RSTD_delta_48 | 48 | $T_c$ | 4 | — | 0, 1, 2, 3, 4 | 4 |
| RSTD_delta_49 | 49 | $T_c$ | — | — | 0 | — |
| RSTD_delta_50 | 50 | $T_c$ | — | — | 0, 1 | — |
| RSTD_delta_51 | 51 | $T_c$ | — | — | 0 | — |
| RSTD_delta_52 | 52 | $T_c$ | — | — | 0, 1, 2 | — |
| RSTD_delta_53 | 53 | $T_c$ | — | — | 0 | — |
| RSTD_delta_54 | 54 | $T_c$ | — | — | 0, 1 | — |
| RSTD_delta_55 | 55 | $T_c$ | — | — | 0 | — |
| RSTD_delta_56 | 56 | $T_c$ | — | — | 0, 1, 2, 3 | — |
| RSTD_delta_57 | 57 | $T_c$ | — | — | 0 | — |
| RSTD_delta_58 | 58 | $T_c$ | — | — | 0, 1 | — |
| RSTD_delta_59 | 59 | $T_c$ | — | — | 0 | — |
| RSTD_delta_60 | 60 | $T_c$ | — | — | 0, 1, 2 | — |
| RSTD_delta_61 | 61 | $T_c$ | — | — | 0 | — |
| RSTD_delta_62 | 62 | $T_c$ | — | — | 0, 1 | — |
| RSTD_delta_63 | 63 | $T_c$ | — | — | 0 | — |
| RSTD_delta_64 | 64 | $T_c$ | — | 5 | — | 4, 5 |
| RSTD_delta_65 | 80 | $T_c$ | — | — | — | 4 |
| RSTD_delta_66 | 96 | $T_c$ | — | 5 | — | 4, 5 |
| RSTD_delta_67 | 112 | $T_c$ | — | — | — | 4 |
| RSTD_delta_68 | 128 | $T_c$ | — | 5 | — | 4, 5 |
| RSTD_delta_69 | 144 | $T_c$ | — | — | — | 4 |
| RSTD_delta_70 | 160 | $T_c$ | — | 5 | — | 4, 5 |
| RSTD_delta_71 | 176 | $T_c$ | — | — | — | 4 |
| RSTD_delta_72 | 192 | $T_c$ | — | 5 | — | 4, 5 |
| RSTD_delta_73 | 208 | $T_c$ | — | — | — | 4 |
| RSTD_delta_74 | 224 | $T_c$ | — | 5 | — | 4, 5 |
| RSTD_delta_75 | 240 | $T_c$ | — | — | — | 4 |
| RSTD_delta_76 | 256 | $T_c$ | — | 5 | — | 4, 5 |
| RSTD_delta_77 | 272 | $T_c$ | — | — | — | 4 |
| RSTD_delta_78 | 288 | $T_c$ | — | 5 | — | 4, 5 |
| RSTD_delta_79 | 304 | $T_c$ | — | — | — | 4 |

2.2 Methods to Adapt Resolution Factor

According to a second embodiment, a measuring node receives a resolution factor k from a second node and further adapts it to obtain a resolution factor k' to be used for its measurement report mapping.

A measuring node receives a first resolution factor k from a second node (e.g., another UE or network node such as a positioning or radio network node, base station, or TRP) and further adapts it to obtain a resolution factor k' to be used for its measurement report mapping to create a measurement report for the measurement. The obtaining can be based on one or more rules, e.g.:

The measuring node determines the quality Q of the measurement and selects the corresponding k' (e.g., higher quality may imply a smaller k'), e.g., value Q1 corresponds to k'_1, Q2 corresponds to k'_2, Q3 corresponds to k'_3, etc.

The measuring node determines k' (e.g., k'=k-A) to be used for the measurement report mapping if the measured cell is the serving cell, otherwise k is used The measuring node determines k' (e.g., k'=k+A) to be used for the measurement report mapping if the measured cell is non-serving cell, otherwise k is used The result of the adaptation is resolution factor k' obtained based on resolution factor k such that k'=max(k, $k_{min}$) and/or k'=min(k, $k_{max}$).

The measuring node determines that k' (different from k) to be used for the measurement report mapping if the measurement value is in a first range, otherwise (measurement value is not a first range or is in a second range) it uses k; furthermore, in some examples, if k=k1, then k'=k'_1, if k=k2, then k'=k'_2, etc. in one example, the first range can comprise measurement values or absolute measurement values below a threshold, while the second range is above the threshold.

The measuring node determines that it can use k'<k and selects k' accordingly, e.g., based on one or more of: the measuring node capability (e.g., can support lower k' than k and/or k is not supported), The measuring node determines k'>k, e.g., based on one or more of: the measuring node capability (e.g., when k is not supported).

The measuring node adapts k' for a measurement involving different FRs. For example, where k' is determined based on k1 corresponding FR1 and k2 corresponding to FR2 when a reference cell is measured in FR1 and a neighbor cell is measured in FR2 for the same RSTD measurement. In one example, k'=max(k1, k2). In another example, k'=min(k1, k2). In yet another example, k' is determined to be >max($k_{min}$, FR1, $k_{min}$, RF2) and/or <min($k_{max}$, FR1, $k_{max}$, RF2).

The measurement report can then be sent to a third node (e.g., another UE or network node such as a positioning or radio network node, base station, or TRP).

In some examples, the measuring node may also implicitly or explicitly indicate to the second node and/or the third node the obtained k' used for the measurement reporting:

An explicit indication may comprise sending k' or a parameter from which k' can be derived.

An implicit indication may comprise sending information or data from which k' can be determined based on a pre-defined rule in one example, an implicit indication may be by means of the measurement quality metric Q sent together with the measurement and the association between the measurement quality metric and k' (e.g., better quality metric or smaller uncertainty or higher accuracy level reported together with the measurement may be associated with a smaller k' based on a pre-defined rule), e.g.: value Q1 is associated with k'_1, Q2 is associated with k'_2, Q3 is associated with k'_3, etc.

According to the above, there are also corresponding methods in the receiving node to receive an implicit or explicit indication and determine k', based on the indication. The determined k' can be used to determine, e.g., the quality or the uncertainty of the received measurement which can be further used in position calculation and/or estimating the quality of the positioning result.

2.3 Methods to Combine the First and the Second Embodiments

According to a third embodiment, the first embodiment (section 2.1) and the second embodiment (section 2.2) are combined, e.g., the measuring node receives a resolution factor k from a network node, determines the set of the applicable resolution factor values, and adapts to obtain k'.

In one further example, based on the determining result, if k is not in the set of the applicable values (see section 2.1 for methods to determine the set of applicable values), the measuring node may further adapt (see also section 2.2) the resolution factor to obtain a resolution factor k' from the set of the applicable values depending on the configured k, e.g.:

k' is an applicable value closest to k so that abs(k-k') is minimized k' is an applicable value closest to k so that k'<k k' is an applicable value closest to k so that k'>k In another further example, the measuring node receives k and adapts it (regardless of whether k is within the set of applicable values) to obtain another resolution factor, k', from the set of the applicable values, e.g., adaptively to the measured value (see methods in section 2.2) and the configured k:

k' is an applicable value (determined by the measured value) which is closest to k so that abs(k-k') is minimized k' is an applicable value (determined by the measured value) which is closest to k so that k'<k k' is an applicable value (determined by the measured value) which is closest to k so that k'>k

2.4 Example Network

In this disclosure, the term "node" can be a network node or a UE. Examples of network nodes are NodeB, base station (BS), multi-standard radio (MSR) radio node such as MSR BS, eNodeB, gNodeB. MeNB, SeNB, integrated access backhaul (IAB) node, network controller, radio network controller (RNC), base station controller (BSC), relay, donor node controlling relay, base transceiver station (BTS), Central Unit (e.g., in a gNB), Distributed Unit (e.g., in a gNB), Baseband Unit, Centralized Baseband, C-RAN, access point (AP), transmission points, transmission nodes, RRU, RRH, nodes in distributed antenna system (DAS), core network node (e.g., Mobile Switching Centre (MSC), Mobility Management Entity (MME), etc.), Operation and Maintenance (O&M), Operations Support System (OSS), Self Optimized Network (SON), positioning node (e.g., E-SMLC), etc.

Another example of a node could be a UE. A UE refers to any type of wireless device communicating with a network node and/or with another UE in a cellular or mobile communication system. Examples of a UE are target device, device-to-device (D2D) UE, vehicular-to-vehicular (V2V), machine type UE, MTC UE or UE capable of machine-to-machine (M2M) communication, PDA, Tablet, mobile terminals, smart phone, laptop embedded equipment (LEE), laptop mounted equipment (LME), USB dongles, etc.

Some embodiments use generic terminology, such as "radio network node" or simply "network node" (NW node), which can be any kind of network node. Examples include base station, radio base station, base transceiver station, base station controller, network controller, evolved Node B (eNB), Node B, gNodeB (gNB), relay node, access point, radio access point, Remote Radio Unit (RRU) Remote Radio Head (RRH), Central Unit (e.g., in a gNB), Distributed Unit (e.g., in a gNB), Baseband Unit, Centralized Baseband, C-RAN, access point (AP etc.

The term Radio Access Technology (RAT) may refer to any RAT, for example, Universal Terrestrial Radio Access (UTRA), Evolved UTRA (E-UTRA), narrow band internet of things (NB-IoT), WiFi, Bluetooth, next generation RAT, New Radio (NR), 4G, 5G, etc. Any of the equipment denoted by the terms node, network node or radio network node may be capable of supporting a single or multiple RATs.

The term signal or radio signal used herein can be any physical signal or physical channel. Examples of downlink (DL) physical signals are reference signals such as Primary Synchronization Signal (PSS), Secondary Synchronization Signal (SSS), Channel State Information Reference Signal (CSI-RS), Demodulation Reference Signal (DMRS), signals in Synchronization Signal Block (SSB), Discovery Reference Signal (DRS), Cell Reference Signal (CRS), Positioning Reference Signal (PRS), etc. Examples of uplink (UL) physical signals are reference signals such as Sounding Reference Signal (SRS), DMRS, etc. The term physical channel (e.g., in the context of channel reception) may be used simply to refer to a channel that contains higher layer information. Examples of physical channels are Physical Broadcast Channel (PBCH), Narrowband PBCH (NPBCH), Physical Downlink Control Channel (PDCCH), short PDCCH (sPDCCH), Machine-Type Communication (MTC) PDCCH (MPDCCH), Narrowband PDCCH (NPDCCH), Enhanced PDCCH (E-PDCCH), Physical Downlink Shared Channel (PDSCH), short PDSCH (sPDSCH), Narrowband PDSCH (NPDSCH), Physical Uplink Control Channel (PUCCH), short PUCCH (sPUCCH), Physical Uplink Shared Channel (PUSCH), short PUSCH (sPUSCH), Narrowband PUSCH (NPUSCH), etc.

The term time resource used herein may correspond to any type of physical resource or radio resource expressed in terms of length of time. Examples of time resources are: symbol, time slot, subframe, radio frame, Transmission Time Interval (TTI), interleaving time, slot, sub-slot, mini-slot, etc.

The term multi-round trip (multi-RTT) positioning measurement used herein correspond to any UE measurement comprising at least one multi-RTT positioning measurement on signals of one serving cell or TRP (e.g., Primary Cell (PCell), Primary Secondary Cell Group Cell (PSCell), etc.) and at least one multi-RTT positioning measurement on signals of another cell or TRP (e.g., a neighbor cell, another serving cell, etc.). Examples of multi-RTT positioning measurements are UE RX-TX time difference measurement, timing advance, PRS-RSRP, etc.

Figure 2:
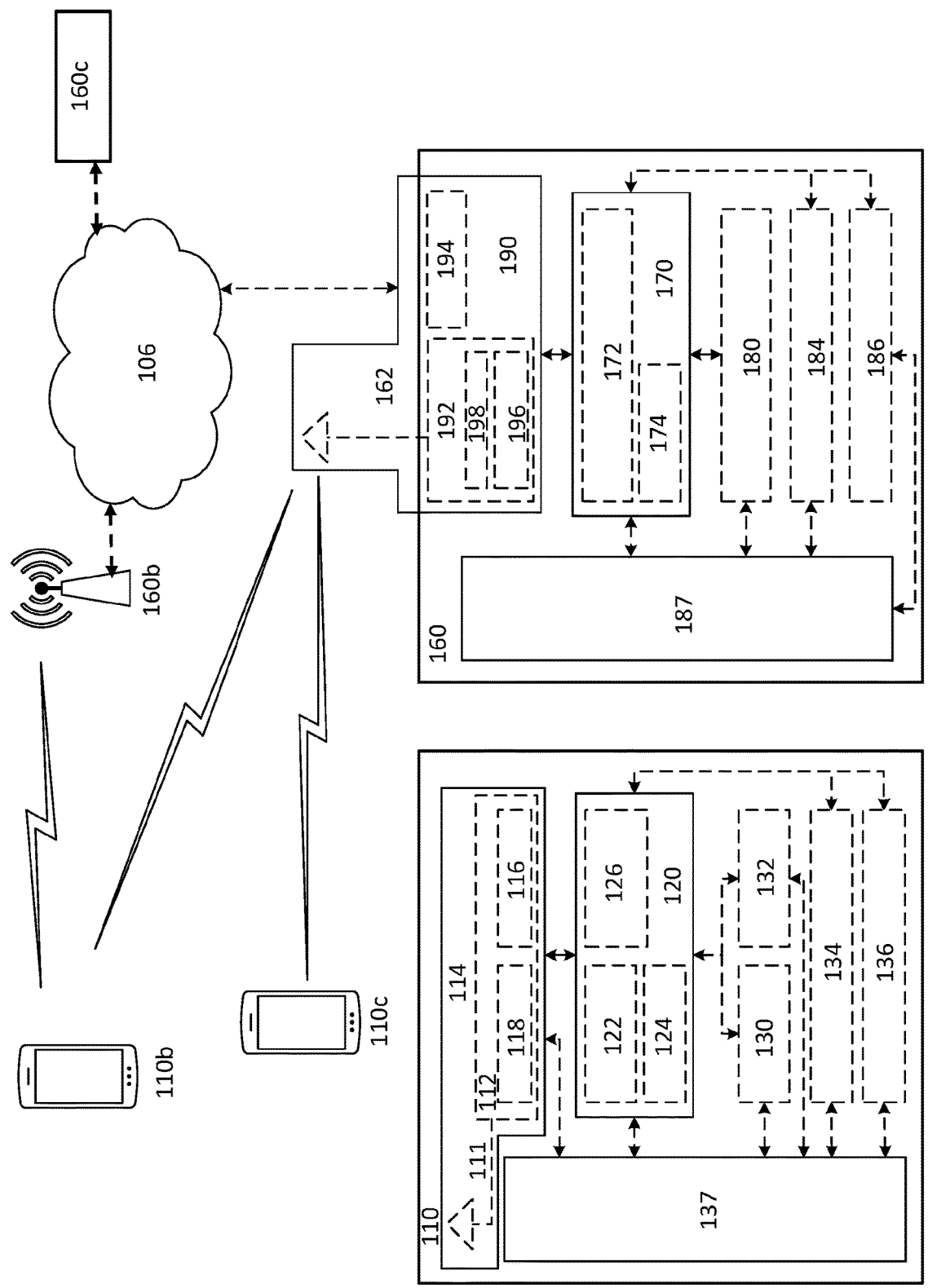
FIG. 2 illustrates an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 106, network nodes 160 and 160b and 160c, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system.

In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 4G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network. FIG. 2 includes network node 160c as an example of a network node other than a TRP, base station, or the like. In certain embodiments, network node 160c may comprise a positioning node (e.g., E-SMLC, LMF). Network node 160c need not necessarily include components for wireless communication (e.g., antenna 162), however, network node 160c may include other components of a network node (e.g., processing circuitry 170, power circuitry 187, etc.).

In FIG. 2, network node 160 includes processing circuitry 170, device readable medium 180, interface 190, auxiliary equipment 184, power source 186, power circuitry 187, and antenna 162. Although network node 160 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, Global System for Mobile communication (GSM), Wide Code Division Multiplexing Access (WCDMA), Long Term Evolution (LTE), New Radio (NR), WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 2 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hardwired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. Wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 3:
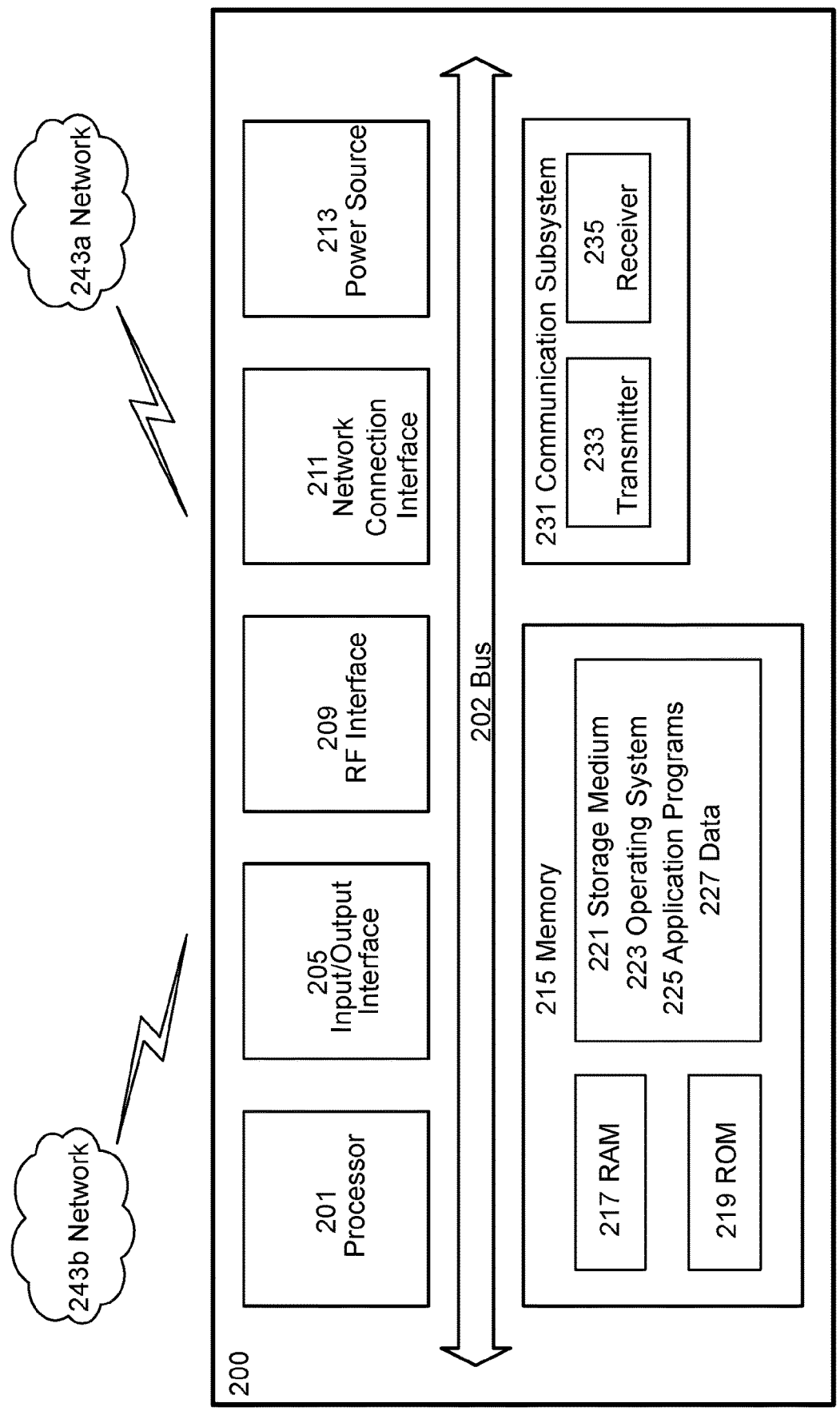
FIG. 3 illustrates an example of User Equipment in accordance with some embodiments.

FIG. 3 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 3, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 3 is a UE, the components discussed herein are equally applicable to a wireless device, and vice-versa.

In FIG. 3, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may utilize all of the components shown in FIG. 3, or only a subset of the components. The level of integration between the components may vary from one UE to another UE. Further, certain UEs may contain multiple instances of a component, such as multiple processors, memories, transceivers, transmitters, receivers, etc.

In FIG. 3, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 3, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 3, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, Universal Terrestrial Radio Access Network (UTRAN), WiMax, or the like. Each transceiver may include transmitter 233 and/or receiver 235 to implement transmitter or receiver functionality, respectively, appropriate to the Radio Access Network (RAN) links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 4:
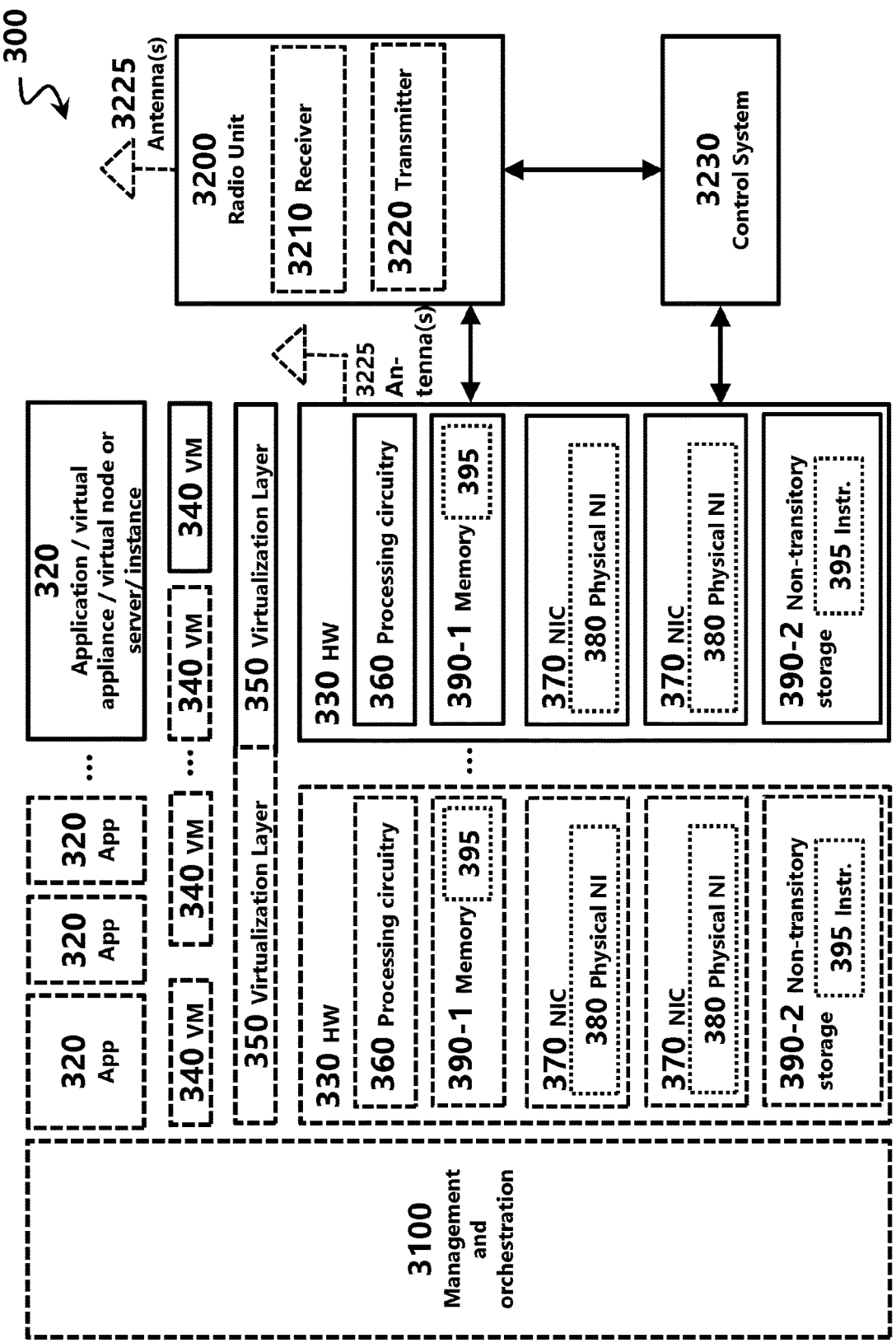
FIG. 4 illustrates an example of a virtualization environment in accordance with some embodiments.

FIG. 4 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 4, hardware 330 may be a standalone network node with generic or specific components. Hardware 330 may comprise antenna 3225 and may implement some functions via virtualization. Alternatively, hardware 330 may be part of a larger cluster of hardware (e.g., such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 4.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 5:
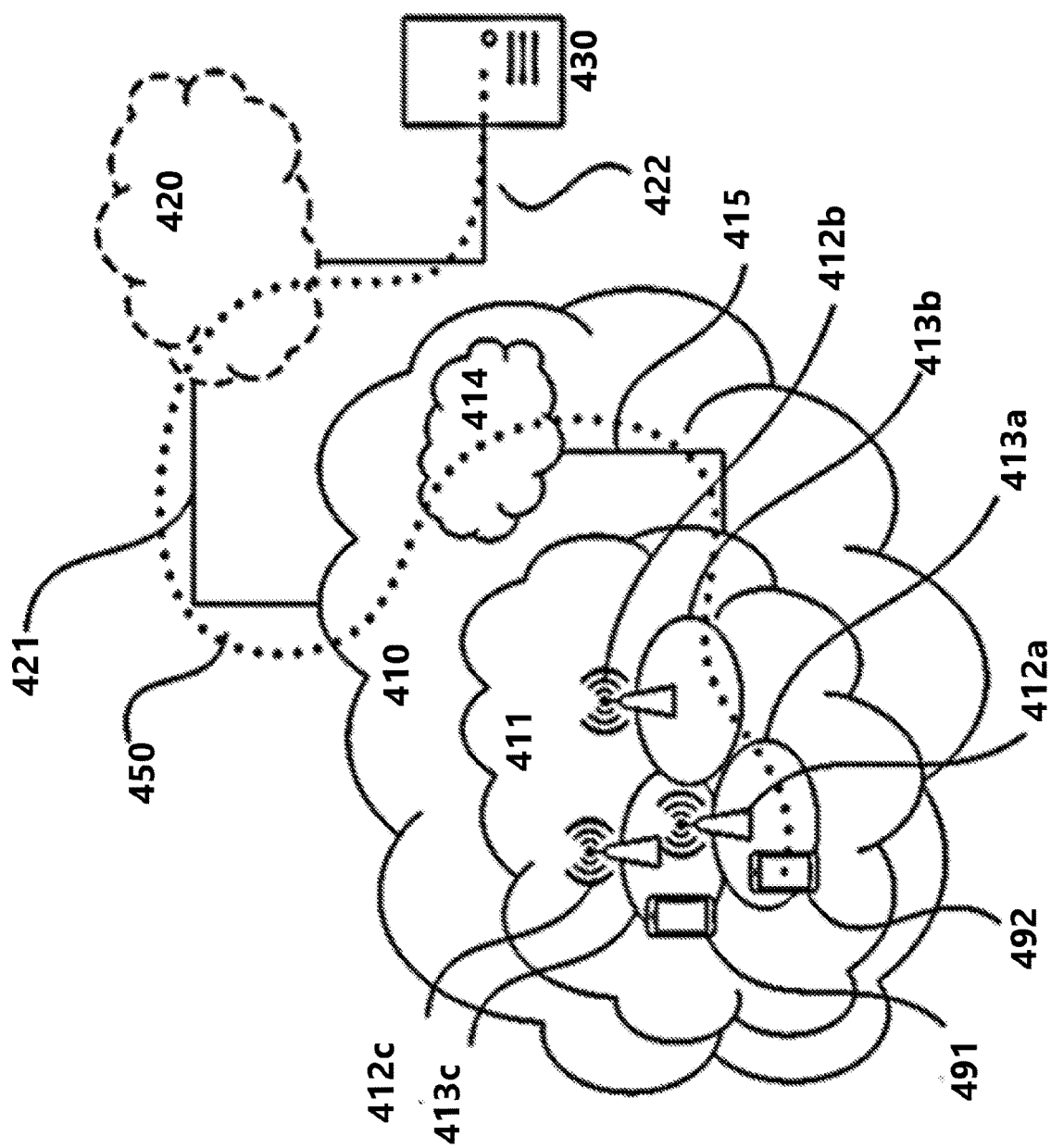
FIG. 5 illustrates an example of a telecommunication network connected via an intermediate network to a host computer in accordance with some embodiments.

With reference to FIG. 5, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 5 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 6. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 6) served by base station 520. Communication interface 526 may be configured to facilitate connection 560 to host computer 510. Connection 560 may be direct or it may pass through a core network (not shown in FIG. 6) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 6:
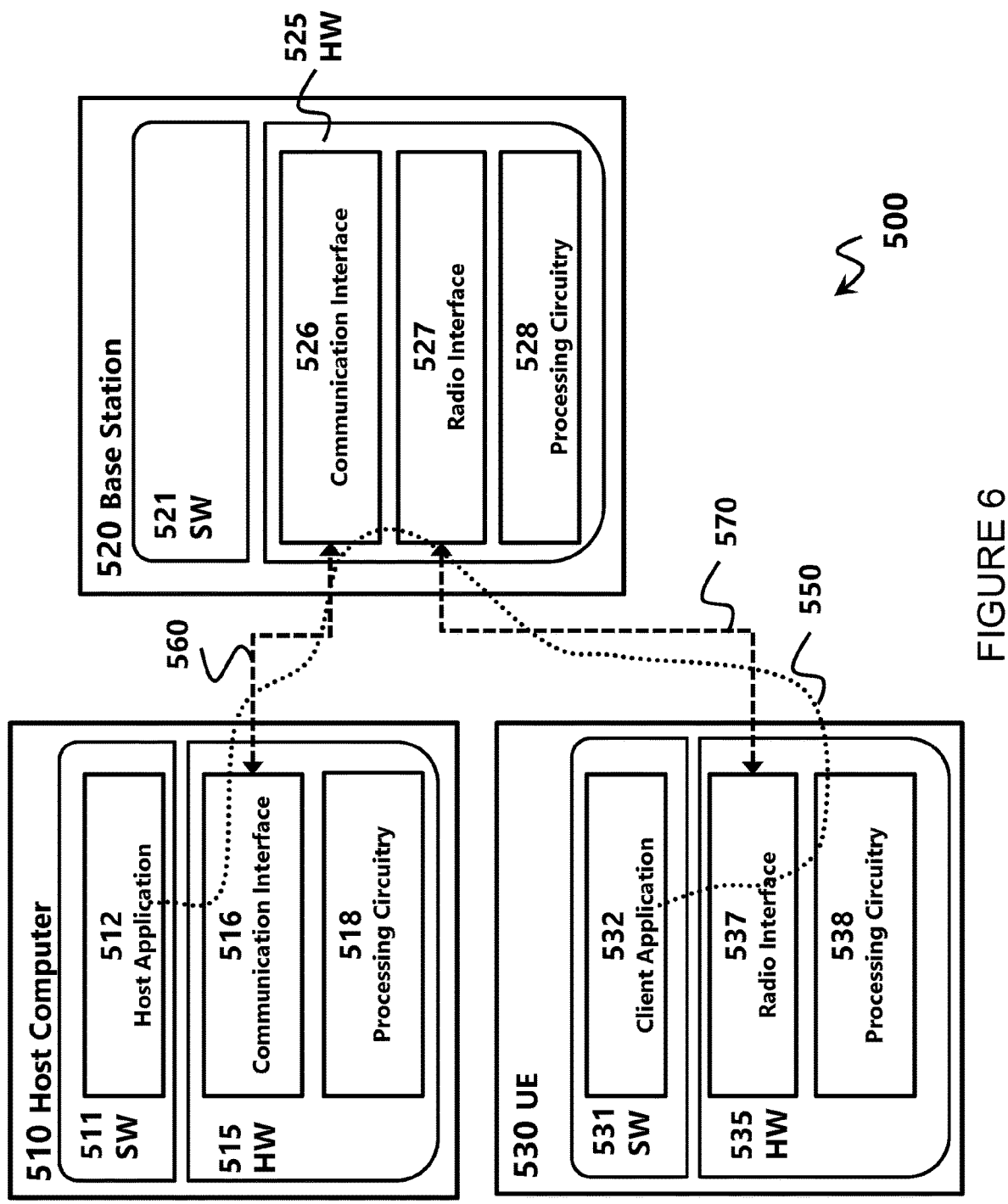
FIG. 6 illustrates an example of a host computer communicating via a base station with a user equipment over a partially wireless connection in accordance with some embodiments.

It is noted that host computer 510, base station 520 and UE 530 illustrated in FIG. 6 may be similar or identical to host computer 430, one of base stations 412a, 412b, 412c and one of UEs 491, 492 of FIG. 5, respectively. This is to say, the inner workings of these entities may be as shown in FIG. 6 and independently, the surrounding network topology may be that of FIG. 5.

In FIG. 6, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 7:
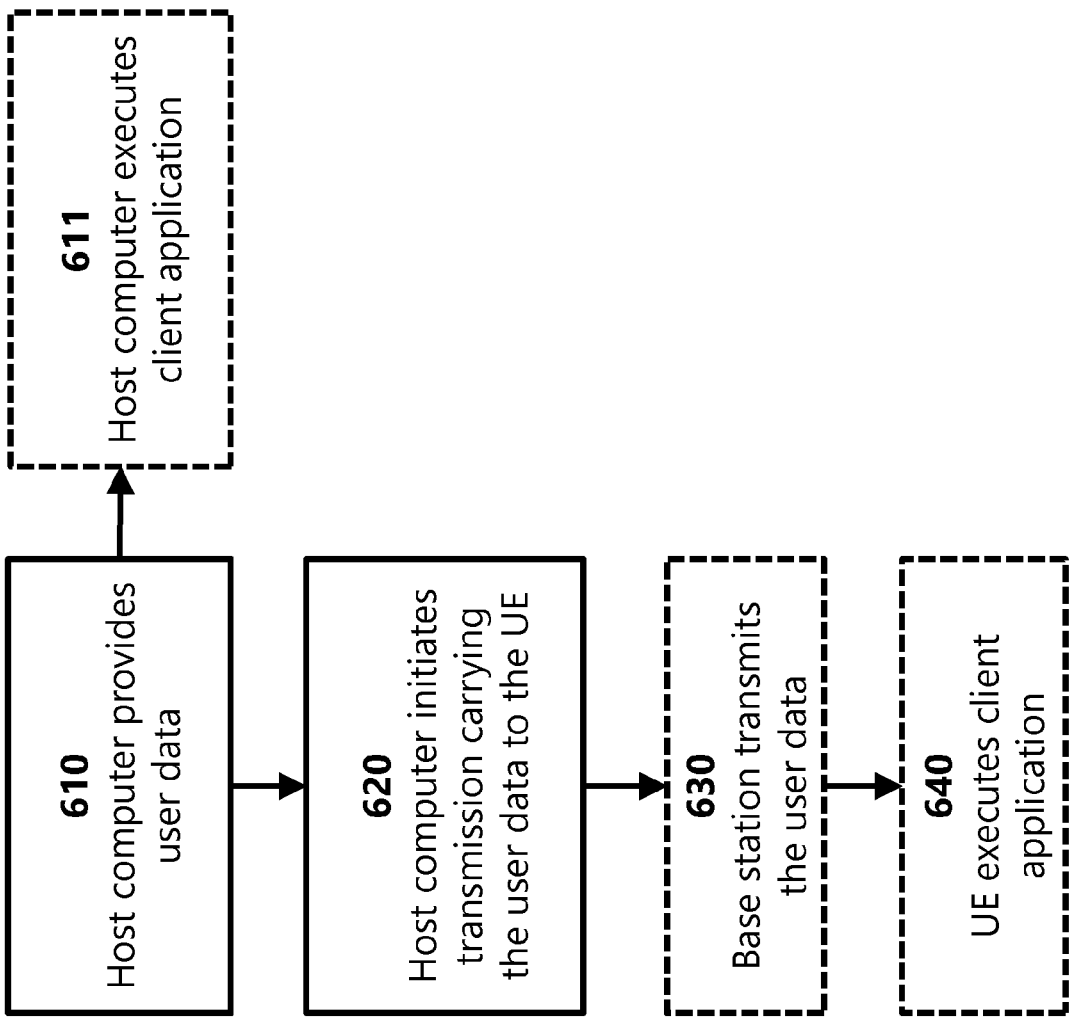
FIG. 7 illustrates an example of methods implemented in a communication system including a host computer, a base station, and a user equipment in accordance with some embodiments.

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 8:
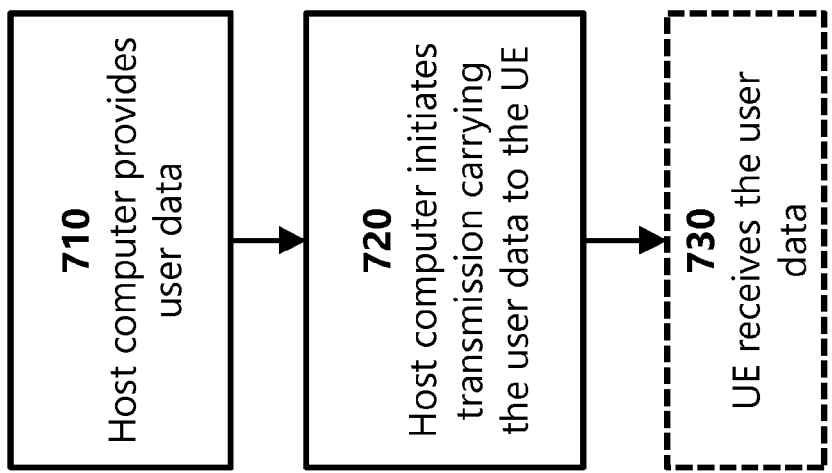
FIG. 8 illustrates an example of methods implemented in a communication system including a host computer, a base station, and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 9:
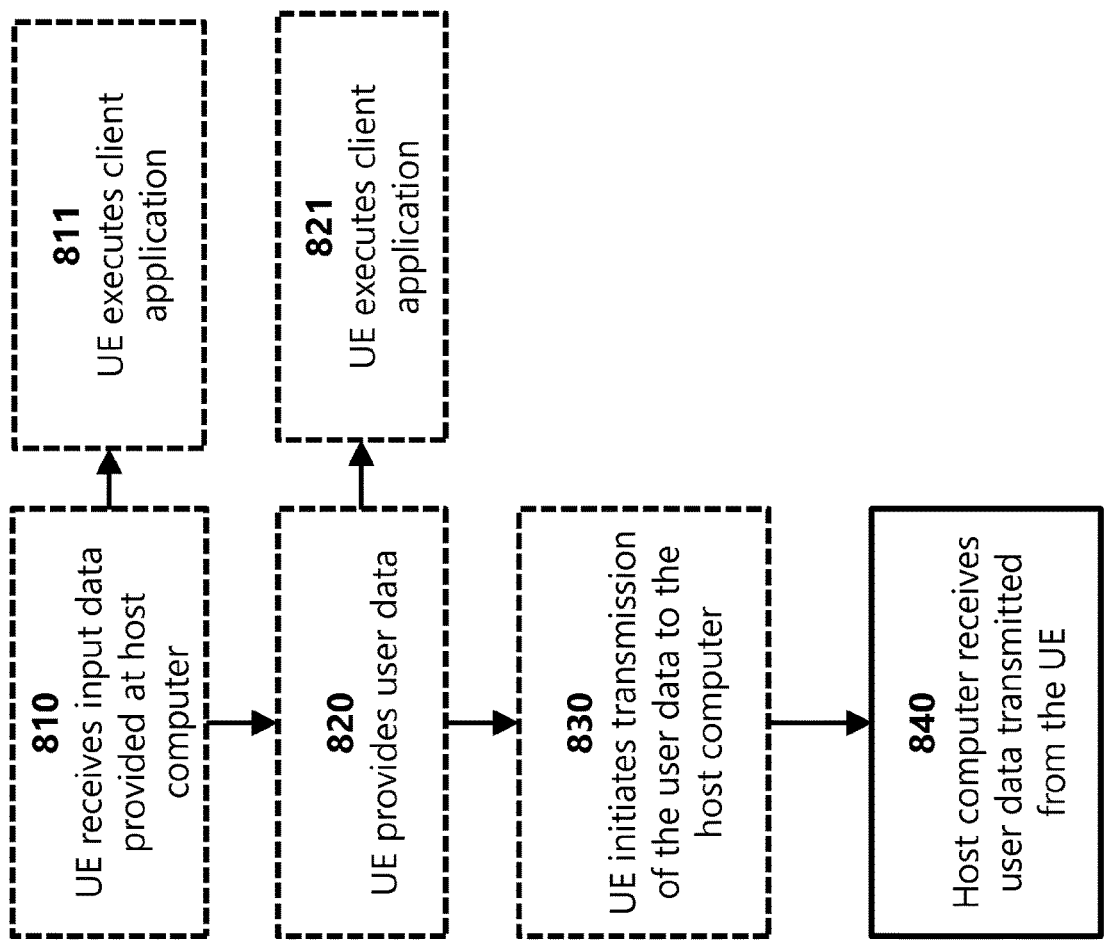
FIG. 9 illustrates an example of methods implemented in a communication system including a host computer, a base station, and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 9 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 10:
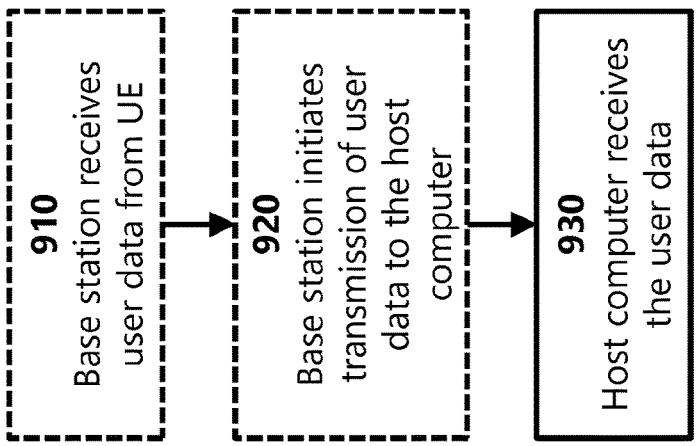
FIG. 10 illustrates an example of methods implemented in a communication system including a host computer, a base station, and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 10 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 11:
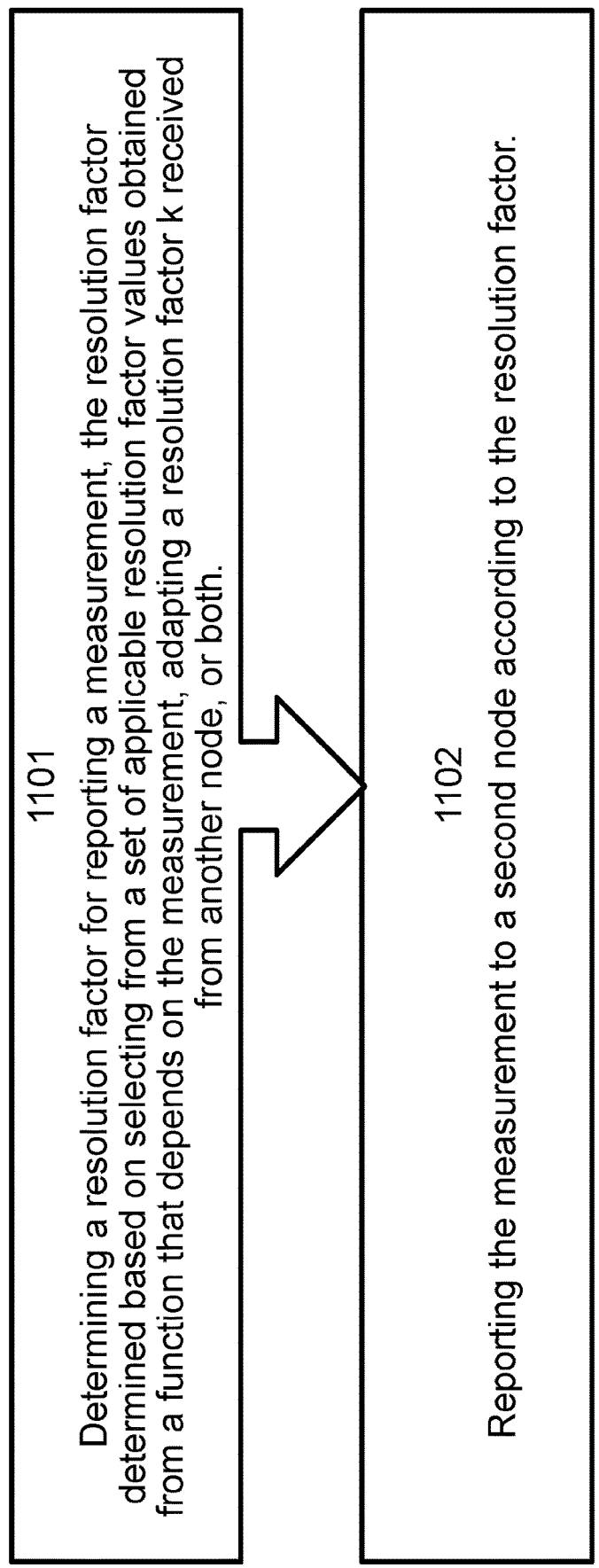
FIG. 11 illustrates an example method in accordance with some embodiments.

FIG. 11 depicts a method in accordance with particular embodiments. The method may be performed by a first node (e.g., a measuring node), such as a wireless device 110 (e.g., UE 200) or a network node 160 described above. The method begins at step 1101 with determining a resolution factor for reporting a measurement. The resolution factor is determined based on selecting from a set of applicable resolution factor values obtained from a function that depends on the measurement (examples of which are described above in Section 2.1), adapting a resolution factor k received from another node (examples of which are described above in Section 2.2), or both (examples of which are described above with respect to Section 2.3). The method proceeds to step 1102 with reporting the measurement to a second node (e.g., a positioning node) according to the resolution factor. For example, the method may report the measurement by mapping a measurement quantity to a measurement report according to the resolution factor determined in step 1101 and sending the measurement report to the second node.

Figure 12:
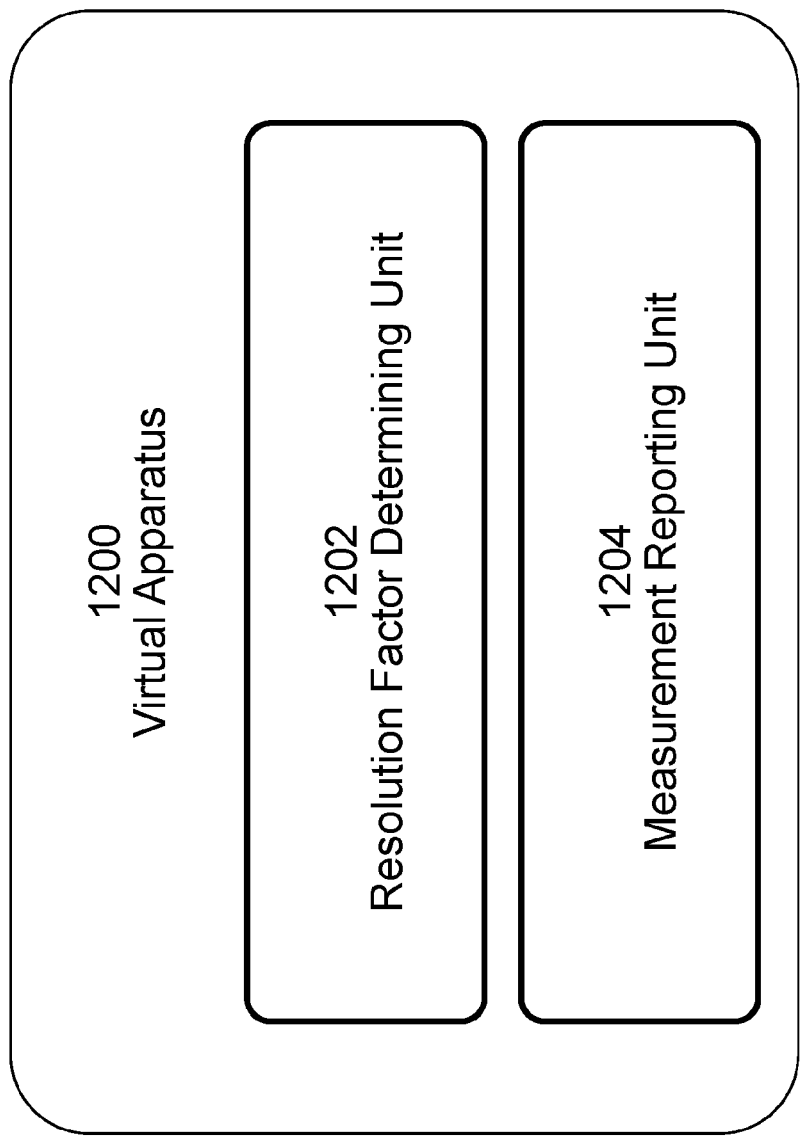
FIG. 12 illustrates an example virtualization apparatus in accordance with some embodiments.

FIG. 12 illustrates a schematic block diagram of an apparatus 1200 in a wireless network (for example, the wireless network shown in FIG. 2). The apparatus may be implemented in a wireless device or network node (e.g., wireless device 110 or network node 160 shown in FIG. 2). Apparatus 1200 is operable to carry out the example method described with reference to FIG. 11 and possibly any other processes or methods disclosed herein. It is also to be understood that the method of FIG. 11 is not necessarily carried out solely by apparatus 1200. At least some operations of the method can be performed by one or more other entities.

Virtual Apparatus 1200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause resolution factor determining unit 1202, measurement reporting unit 1204, and any other suitable units of apparatus 1200 to perform corresponding functions according one or more embodiments of the present disclosure.

As illustrated in FIG. 12, apparatus 1200 includes resolution factor determining unit 1202 and measurement reporting unit 1204. Resolution factor determining unit 1202 is configured to determine a resolution factor for reporting a measurement. The resolution factor is determined based on selecting from a set of applicable resolution factor values obtained from a function that depends on the measurement (examples of which are described above in Section 2.1), adapting a resolution factor k received from another node (examples of which are described above in Section 2.2), or both (examples of which are described above with respect to Section 2.3). Measurement reporting unit 1204 is configured to report the measurement according to the resolution factor determined by the resolution factor determining unit 1202. For example, measurement reporting unit 1204 may report the measurement by mapping a measurement quantity to a measurement report according to the resolution factor and sending the measurement report to another node.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

The Group A and Group B embodiments below provide further examples. Certain examples describe a node (e.g., first node, second node, or another node) that sends or receives certain information. A node may send/receive information in any suitable manner. For example, in certain embodiments, the information itself may be sent. In other embodiments, an indication may be sent (explicitly or implicitly) and the receiving node may determine the information from the indication, e.g., according to a table lookup, a calculation, or other technique.

EMBODIMENTS

Group A Embodiments

1. A method in a first node, the method comprising:
determining a resolution factor for reporting a measurement; and
reporting the measurement to a second node according to the resolution factor.
2. The method of embodiment 1, further comprising:
obtaining the measurement by measuring a radio signal.
3. The method of any of embodiments 1-2, wherein the measurement comprises one of the following types of measurements:
an RSTD measurement,
a Rx-Tx time difference measurement,
a timing advance measurement,
a round trip time (RTT) measurement,
a time of arrival (TOA) measurement,
a timing measurement, and/or
a measurement for positioning.
4. The method of any of embodiments 1-3, wherein the first node comprises a measuring node, a radio network node (e.g., a transmission/reception point (TRP), a base station, etc.), or a wireless device (e.g., a UE).
5. The method of any of embodiments 1-4, wherein the second node comprises a positioning node, a radio network node (e.g., a transmission/reception point (TRP), a base station, etc.), or a wireless device (e.g., a UE).

6. The method of any of embodiments 1-5, further comprising:
receiving, from the second node or a different node, a measurement configuration or assistance data for configuring the measurement.

7. The method of any of embodiments 1-6, wherein the resolution factor is determined for new radio (NR).

8. The method of any of embodiments 1-7, wherein reporting the measurement to the second node according to the resolution factor comprises using the resolution factor for a measurement report mapping.

9. The method of any of embodiments 1-8, wherein determining the resolution factor for reporting the measurement comprises:
determining a set of applicable resolution factor values based on a function, wherein the function depends at least in part on a measurement quantity of the measurement; and
selecting a resolution factor value from the set of applicable resolution factor values.

10. The method of embodiment 9, wherein the function further depends on one or more of:
a frequency range (FR) in which the measurement is performed;
a reference quantity;
a measurement purpose;
whether a cell in which the measurement is performed is a serving cell or a non-serving cell; and/or
a positioning method.

11. The method of any of embodiments 9-10, wherein the function comprises $F=(k\varepsilon\ [k_{min}, k_{max}])$, which is true when k belongs to the indicated range $[k_{min}, k_{max}]$ and false otherwise.

12. The method of any of embodiments 9-10, wherein the function comprises $F=mod(\Delta_{RSTD}, 2^k)$ where $k\varepsilon[k_{min}, k_{max}]$ is the resolution factor, and the set of applicable resolution factors k comprises any k in $[k_{min}, k_{max}]$ satisfying $mod(\Delta_{RSTD}, 2^k)=0$, where $\Delta_{RSTD}$ is the measured relative quantity.

13. The method of any of embodiments 11-12, wherein $k_{min}$ and $k_{max}$ are pre-defined.

14. The method of any of embodiments 11-12, wherein $k_{min}$ and $k_{max}$ depend on one or more of: measurement frequency range, reference measurement quantity, measurement purpose, serving or non-serving cell, positioning method, etc.

15. The method of any of embodiments 1-14, wherein determining the resolution factor for reporting the measurement comprises:
receiving a resolution factor k from the second node or a different node; and
adapting the resolution factor k to obtain a resolution factor k' to be used for reporting the measurement.

16. The method of embodiment 15, further comprising: indicating the resolution factor k' to the second node or to the different node.

17. The method of embodiment 16, wherein the resolution factor k' is indicated explicitly.

18. The method of embodiment 16, wherein the resolution factor k' is indicated implicitly.

19. The method of any of embodiments 15-19, wherein determining the resolution factor for reporting the measurement comprises:
determining whether the resolution factor k is in the set of applicable resolution factor values, and
adapting the resolution factor k to obtain the resolution factor k' based on determining that the resolution factor k is not in the set of application resolution factor values.

20. A method in a second node, the method comprising:
receiving a measurement report from a first node; and
determining a measurement quantity based on a mapping that associates the measurement report to the measurement quantity, the mapping according to a resolution factor.

21. The method of embodiment 20, wherein the measurement comprises one of the following types of measurements:
an RSTD measurement,
a Rx-Tx time difference measurement,
a timing advance measurement,
a round trip time (RTT) measurement,
a time of arrival (TOA) measurement,
a timing measurement, and/or
a measurement for positioning.

22. The method of any of embodiments 20-21, wherein the first node comprises a measuring node, a radio network node (e.g., a transmission/reception point (TRP), a base station, etc.), or a wireless device (e.g., a UE).

23. The method of any of embodiments 20-22, wherein the second node comprises a positioning node, a radio network node (e.g., a transmission/reception point (TRP), a base station, etc.), or a wireless device (e.g., a UE).

24. The method of any of embodiments 20-23, further comprising:
sending the first node a measurement configuration or assistance data for configuring the measurement.

25. The method of any of embodiments 20-24, wherein the resolution factor is for new radio (NR).

26. The method of any of embodiments 20-25, further comprising:
sending a resolution factor k to the first node; and
receiving an indication that the first node has adapted the resolution factor k to obtain a resolution factor k' being used for reporting the measurement.

27. The method of embodiment 26, wherein the resolution factor k' is indicated explicitly.

28. The method of embodiment 26, wherein the resolution factor k' is indicated implicitly.

29. The method of any of embodiments 1-28, further comprising:
providing user data; and
forwarding the user data to a host computer via the transmission to the base station.

30. The method of any of embodiments 1-29, further comprising:
obtaining user data; and
forwarding the user data to a host computer or a wireless device.

Group B Embodiments

1. A wireless device, the wireless device comprising:
processing circuitry configured to perform any of the steps of any of the Group A embodiments; and
power supply circuitry configured to supply power to the wireless device.

2. A base station, the base station comprising:
processing circuitry configured to perform any of the steps of any of the Group A embodiments;
power supply circuitry configured to supply power to the base station.

3. A first node, the first node comprising:
processing circuitry configured to perform any of the steps of any of the Group A embodiments;
power supply circuitry configured to supply power to the first node.

4. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

5. A computer program, the computer program comprising instructions which when executed on a computer perform any of the steps of any of the Group A embodiments.

6. A computer program product comprising a computer program, the computer program comprising instructions which when executed on a computer perform any of the steps of any of the Group A embodiments.

7. A non-transitory computer-readable storage medium or carrier comprising a computer program, the computer program comprising instructions which when executed on a computer perform any of the steps of any of the Group A embodiments.

8. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group A embodiments.

9. The communication system of the pervious embodiment further including the base station.

10. The communication system of the previous 2 embodiments, further including the UE, wherein the UE is configured to communicate with the base station.

11. The communication system of the previous 3 embodiments, wherein:
the processing circuitry of the host computer is configured to execute a host application, thereby providing the user data; and
the UE comprises processing circuitry configured to execute a client application associated with the host application.

12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group A embodiments.

13. The method of the previous embodiment, further comprising, at the base station, transmitting the user data.

14. The method of the previous 2 embodiments, wherein the user data is provided at the host computer by executing a host application, the method further comprising, at the UE, executing a client application associated with the host application.

15. A user equipment (UE) configured to communicate with a base station, the UE comprising a radio interface and processing circuitry configured to performs the of the previous 3 embodiments.

16. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

17. The communication system of the previous embodiment, wherein the cellular network further includes a base station configured to communicate with the UE.

18. The communication system of the previous 2 embodiments, wherein:
the processing circuitry of the host computer is configured to execute a host application, thereby providing the user data; and
the UE's processing circuitry is configured to execute a client application associated with the host application.

19. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

20. The method of the previous embodiment, further comprising at the UE, receiving the user data from the base station.

21. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

22. The communication system of the previous embodiment, further including the UE.

23. The communication system of the previous 2 embodiments, further including the base station, wherein the base station comprises a radio interface configured to communicate with the UE and a communication interface configured to forward to the host computer the user data carried by a transmission from the UE to the base station.

24. The communication system of the previous 3 embodiments, wherein:
the processing circuitry of the host computer is configured to execute a host application; and
the UE's processing circuitry is configured to execute a client application associated with the host application, thereby providing the user data.

25. The communication system of the previous 4 embodiments, wherein:
- the processing circuitry of the host computer is configured to execute a host application, thereby providing request data; and
- the UE's processing circuitry is configured to execute a client application associated with the host application, thereby providing the user data in response to the request data.

26. A method implemented in a communication system including a host computer, a base station and a user equipment (UE), the method comprising:
- at the host computer, receiving user data transmitted to the base station from the UE, wherein the UE performs any of the steps of any of the Group A embodiments.

27. The method of the previous embodiment, further comprising, at the UE, providing the user data to the base station.

28. The method of the previous 2 embodiments, further comprising:
- at the UE, executing a client application, thereby providing the user data to be transmitted; and
- at the host computer, executing a host application associated with the client application.

29. The method of the previous 3 embodiments, further comprising:
- at the UE, executing a client application; and
- at the UE, receiving input data to the client application, the input data being provided at the host computer by executing a host application associated with the client application,
- wherein the user data to be transmitted is provided by the client application in response to the input data.

30. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group A embodiments.

31. The communication system of the previous embodiment further including the base station.

32. The communication system of the previous 2 embodiments, further including the UE, wherein the UE is configured to communicate with the base station.

33. The communication system of the previous 3 embodiments, wherein:
- the processing circuitry of the host computer is configured to execute a host application;
- the UE is configured to execute a client application associated with the host application, thereby providing the user data to be received by the host computer.

34. A method implemented in a communication system including a host computer, a base station and a user equipment (UE), the method comprising:
- at the host computer, receiving, from the base station, user data originating from a transmission which the base station has received from the UE, wherein the UE performs any of the steps of any of the Group A embodiments.

35. The method of the previous embodiment, further comprising at the base station, receiving the user data from the UE.

36. The method of the previous 2 embodiments, further comprising at the base station, initiating a transmission of the received user data to the host computer.

Figure 13:
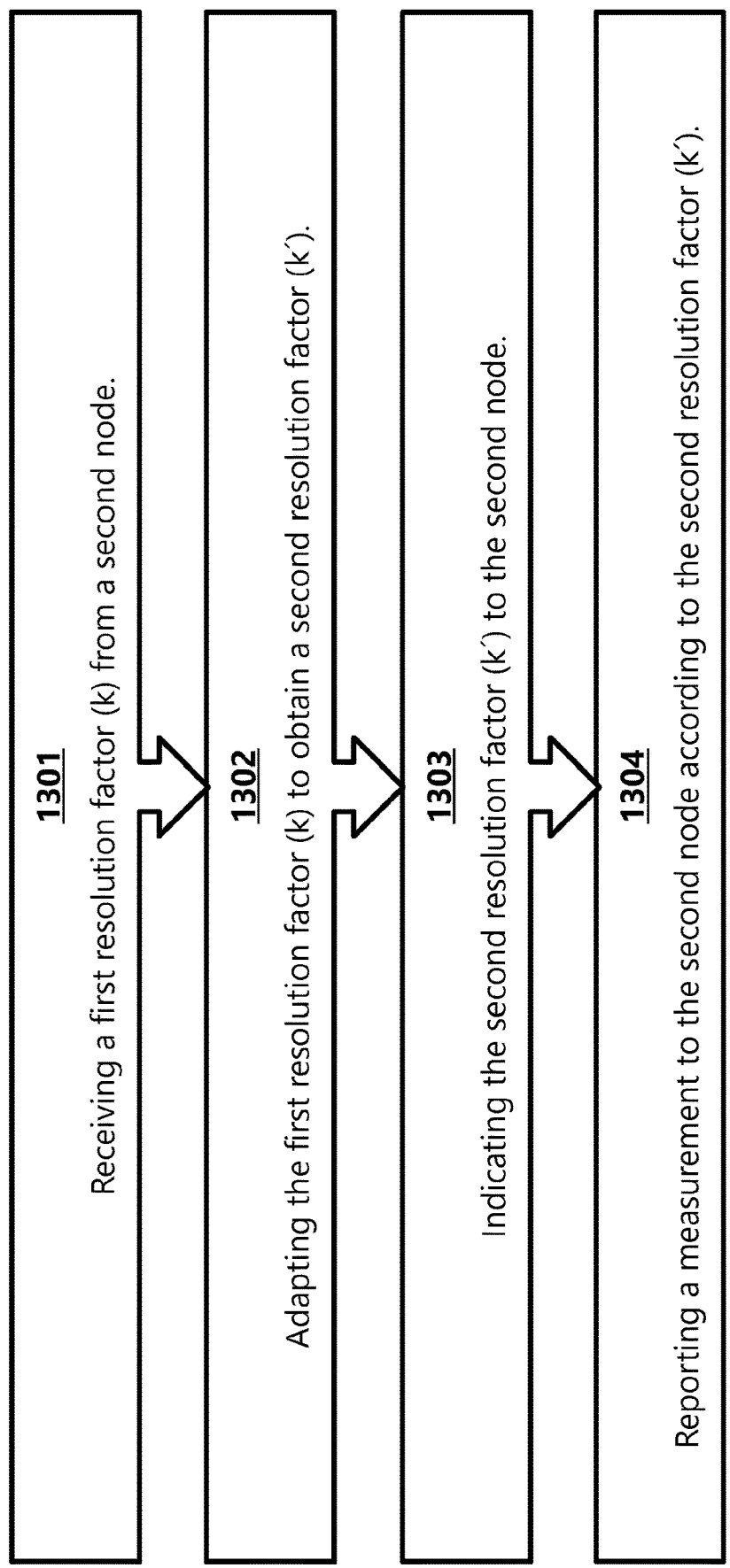
FIG. 13 illustrates an example method in a first node in accordance with some embodiments.

FIG. 13 illustrates an example of a method that may be performed by a first node. The first node may be a measuring node. As an example, a measuring node can be a radio network node, such as network node 160, which can be a TRP, a base station, etc. As another example, a measuring node can be a wireless device, such as wireless device 110, which can be a UE (e.g., UE 200). In certain embodiments, the first node comprises processing circuitry configured to perform the method of FIG. 13 (e.g., processing circuitry 120, 170, 201). The first node may communicate with a second node. Examples of a second node also include a radio network node or a wireless device. Other examples of a second node include a positioning node, such as an LMF or E-SMLC, see e.g., network node 160c. According to certain embodiments, a computer program comprises instructions that when executed on a computer (such as processing circuitry of the first node) perform any of the steps of the method of FIG. 13. In certain embodiments, a computer program product comprises the computer program. In certain embodiments, a non-transitory computer-readable storage medium or carrier comprises a computer program.

The method of FIG. 13 begins at step 1301 with receiving a first resolution factor (k) from a second node. As an example, the first resolution factor (k) may indicate a reporting granularity for timing measurements. The method proceeds to step 1302 with adapting the first resolution factor (k) to obtain a second resolution factor (k'). In step 1303, the method indicates the second resolution factor (k') to the second node. The second resolution factor (k') may be implicitly indicated or explicitly indicated to the second node, depending on the embodiment. The method then reports a measurement to the second node according to the second resolution factor (k'), as shown in step 1304. In certain embodiments, reporting the measurement to the second node according to the resolution factor comprises using the resolution factor for a measurement report mapping.

To adapt the first resolution factor (k) in step 1302, certain embodiments implement one or more of the examples described with respect to the headings "2.1 Methods to Determine A Set of Applicable Resolution Factor Values," "2.2 Methods to Adapt Resolution Factor," and/or "2.3 Methods to Combine the First and the Second Embodiments" above. Certain of these examples are discussed below.

In certain embodiments, adapting the first resolution factor (k) in step 1302 comprises determining a set of applicable values and selecting one of the values in the set as the second resolution factor (k'). Prior to adapting the first resolution factor (k), some embodiments may determine whether the first resolution factor (k) is in the set of applicable values. Certain embodiments may determine to adapt the first resolution factor (k) in response to determining that (k) is not in the set of applicable values. Certain embodiments may determine not to adapt the first resolution factor (k) in response to determining that (k) is in the set of applicable values.

In certain embodiments, adapting the first resolution factor (k) in step 1302 comprises obtaining a measured value and adapting the first resolution factor (k) adaptively to the measured value in order to obtain the second resolution factor (k'). The measured value is obtained based on measuring a radio signal.

In certain embodiments, adapting the first resolution factor (k) in step 1302 comprises selecting the second resolution factor (k') from a set of applicable values, the set of applicable values determined based on a measured value.

The measured value may be a value that the first node obtains by measuring a radio signal. Examples include an RSTD measurement, a Rx-Tx time difference measurement, a timing advance measurement, an RTT measurement, a TOA measurement, a timing measurement, and/or a measurement for positioning.

In certain embodiments, adapting the first resolution factor (k) comprises determining a set of applicable values based on a function, such as one of the following functions:

$F=(k\varepsilon[k_{min}, k_{max}])$, which is true when the applicable value belongs to the indicated range $[k_{min}, k_{max}]$ and false otherwise; or $F=\mod(\Delta_{RSTD}, 2^k)$ where $k\varepsilon[k_{min}, k_{max}]$ is the first resolution factor, and the set of applicable values comprises any k in $[k_{min}, k_{max}]$ satisfying $\mod(\Delta_{RSTD}, 2^k)=0$, where $\Delta_{RSTD}$ is the measured value.

In certain embodiments, $k_{min}$ and $k_{max}$ are pre-defined. In certain embodiments, $k_{min}$ and $k_{max}$ depend on one or more of: measurement frequency range, reference measurement quantity, measurement purpose, serving or non-serving cell, or positioning method. More generally, in certain embodiments, the function depends at least in part on one or more of the following: an FR in which a measurement is performed, a reference quantity, a measured purpose, whether a cell in which the measurement is performed is a serving cell or a non-serving cell, and/or a positioning method.

In certain embodiments, the function depends at least in part on a measured value. The measured value on which the function depends may be obtained by the first node by measuring a radio signal. Examples radio signal measurements include an RSTD measurement, a Rx-Tx time difference measurement, a timing advance measurement, an RTT measurement, a TOA measurement, a timing measurement, and/or a measurement for positioning. As indicated above, the measured value may be used to determine the $k_{min}$ and/or $k_{max}$ of a function for determining a set of applicable values. The second resolution factor (k') can be selected from the set of applicable values.

As discussed above, the set of applicable values can be determined in various ways, such as based on a function, based on a measured value, or both (e.g., a function may be based on a measured value). In certain embodiments, the second resolution factor (k') is selected as the applicable value that is closest to the first resolution factor (k) out of those of the set of applicable values that are less than the first resolution factor (k). That is, k' is an applicable value closest to k so that k'<k. In other embodiments, the second resolution factor (k') is selected as the applicable value that is closest to the first resolution factor (k) out of those of the set of applicable values that are greater than the first resolution factor (k). That is, k' is an applicable value closest to k so that k'>k. In other embodiments, the second resolution factor (k') is selected as the applicable value that is closest to the first resolution factor (k) so that the absolute value of the second resolution factor subtracted from the first resolution factor (abs(k-k')) is minimized. That is, k' is an applicable value closest to k so that abs(k-k') is minimized.

The method of FIG. 13 may be used for any suitable technology. In certain embodiments, the second resolution factor (k') is determined for new radio (NR).

Figure 14:
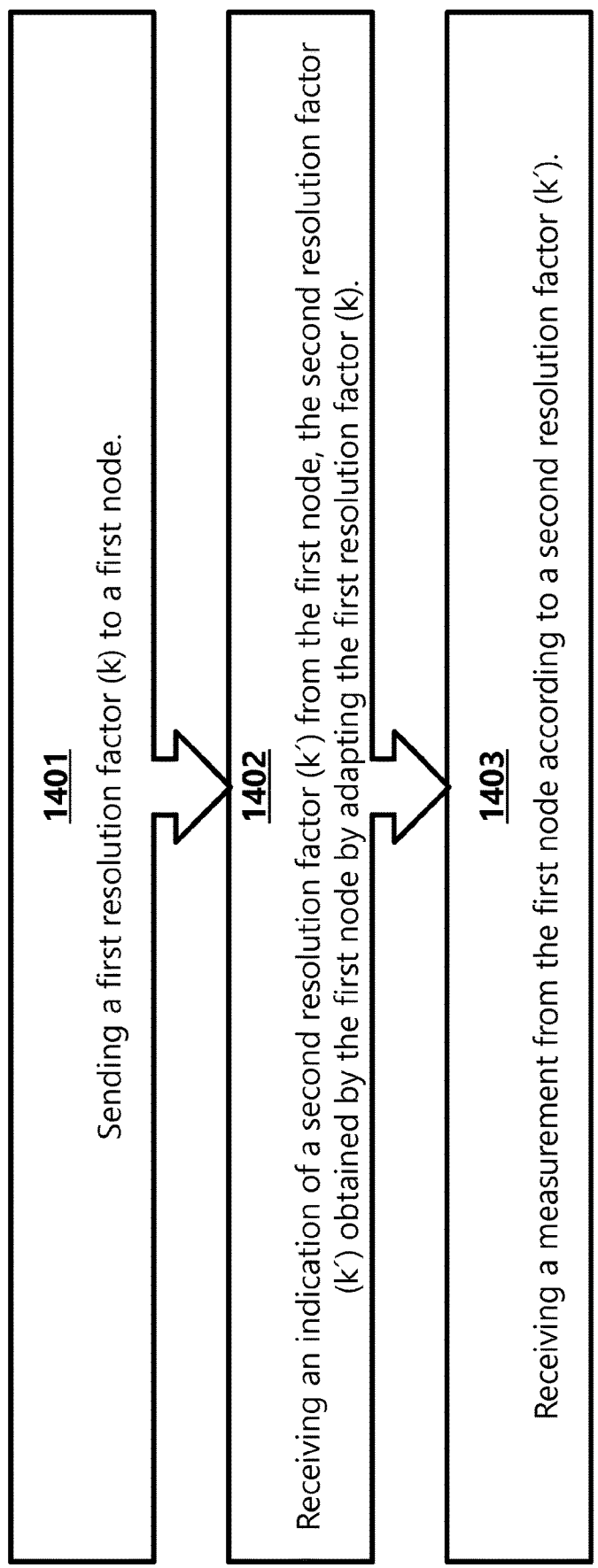
FIG. 14 illustrates an example method in a second node in accordance with some embodiments.

FIG. 14 illustrates an example of a method that may be performed by a second node. As an example, the second node can be a radio network node, such as network node 160, which can be a TRP, a base station, etc. As another example, the second node can be a wireless device, such as wireless device 110, which can be a UE (e.g., UE 200). As another example, the second node can be a positioning node (e.g., LMF, E-SMLC), such as network node 160c. In certain embodiments, the second node comprises processing circuitry configured to perform the method of FIG. 14 (e.g., processing circuitry 120, 170, 201). The second node may communicate with a first node. Examples of a first node also include a radio network node or a wireless device. According to certain embodiments, a computer program comprises instructions that when executed on a computer (such as processing circuitry of the first node) perform any of the steps of the method of FIG. 14. In certain embodiments, a computer program product comprises the computer program. In certain embodiments, a non-transitory computer-readable storage medium or carrier comprises a computer program. In general, functionality described in the method of FIG. 14 may be reciprocal to functionality described in the method of FIG. 13. As an example, FIG. 13 includes a step where a first node receives a first resolution factor (k) from a second node, and FIG. 14 includes a reciprocal step where the second node sends the first resolution factor (k) to the first node.

The method of FIG. 14 begins at step 1401 with sending a first resolution factor (k) to a first node. In certain embodiments, the first resolution factor (k) indicates a reporting granularity for timing measurements. At step 1402, the method receives from the first node an indication of a second resolution factor (k') that the first node obtained by adapting the first resolution factor (k). In certain embodiments, the indication is received implicitly. In other embodiments, the indication is received explicitly. At step 1403, the method receives a measurement from the first node according to the second resolution factor (k'). The second node may be adapted to support a second resolution factor (k') that the first node obtains by adapting the first resolution factor (k) according to any of the examples described above with respect to FIG. 13.

2.5 Example Standards Implementation

The following provides examples of how certain embodiments described above may be implemented in a standard.
3GPP TSG-RAN WG4 Meeting #94-e R4-20xxxx
Electronic Meeting, Feb. 24-Mar. 6, 2020
Agenda Item: xxxx
Source: Ericsson
Title: On PRS RSTD measurement report mapping
Document for: Discussion 1. Introduction This Appendix discusses details for PRS RSTD measurement reporting.

2. Discussion

In LTE, the RSTD measurement report mapping (see also Annex A below) has two levels: the first level (reported values are according to Table 9.1.10.3-1) is non-linear with 1 $T_s$ resolution in the middle of the range and 5 $T_s$ at the edges of the range, and the second level is the high-accuracy level when the UE reports both a value ("rstd") from Table 9.1.10.3-1 and a value ("delta-rstd") from Table 9.1.10.4-1 with resolution 0.5 $T_s$ (instead of 1 $T_s$) or 1 $T_s$ (instead of 5 $T_s$).

In [1], the following was agreed for the RSTD reporting range:
The Max/Min reported values are same as in LTE for FR1 and FR2

For the first-level accuracy, the min and max reported values are RSTD_0000 and RSTD_12711, respectively (12712 values in total). For high accuracy, the min and max reported values RSTD_delta_0 and RSTD_delta_5, respectively (6 values in total).

In [2], RAN1 informs about the following RAN1 agreements on RSTD reporting mapping:

The reporting granularity for the UE/gNB timing measurements (DL RSTD, the UE Rx-Tx time difference, UL RTOA, gNB Rx-Tx time difference) is defined as $T=T_c 2^k$, where k is a configuration parameter with a minimum value of at most 0.

Note: RAN4 can determine if −1 can be a minimum value

RAN1 assumes that the details of the reporting granularity and ranges for the UE/gNB timing measurements (DL RTSD, the UE Rx-Tx time difference, UL RTOA, gNB Rx-Tx time difference) will be determined by RAN4, including the potential relation of the parameter k to DL PRS bandwidth.

For NR, the same two-level approach is proposed. For the first level, a reference quantity is reported by the UE based on a table (let's call it Table 1) similar to Table 9.1.10.3-1 from TS 36.133. For the second (higher resolution) level, a relative quantity $\Delta_{RSTD}$ based on another table (let's call it Table 2) is reported by the UE.

1. Proposal 1: Reuse LTE approach, where the UE reports a reference quantity rstd and a relative quantity $\Delta_{RSTD}$.
2. Proposal 2: The reportable reference quantities are the same as Table 9.1.10.3-1 from TS 36.133.

The measured RSTD is then such that it exceeds the lower bound of the corresponding range from Table 1 by a value falling between $\Delta_{RSTD}$ and $\Delta_{RSTD}$+resolutionStep, where the resolutionStep can be, e.g., 1 Tc, 2 Tc, 4 Tc, 8 Tc, 16 Tc, and 32 Tc, corresponding to k=0, 1, 2, 3, 4, and 5 in $T_c 2^k$ in [2].

3. Proposal 3: The maximum step in Table 2 is 32 Tc ($k_{max}$=5) for both center and edge ranges of the reference quantities, which corresponds to 0.5 $T_s$ in LTE, both FR1 and FR2.
4. Proposal 4: The minimum step in Table 2 is:
   In FR1:
     16 $T_c$ ($k_{min,FR1,center}$=4) for the center range of the reference quantities, which corresponds to 0.25 $T_s$ in LTE,
     32 $T_c$ ($k_{min,FR1,edge}$=5) for the edge ranges of the reference quantities, which corresponds to 0.5 $T_s$ in LTE.
   In FR2:
     1 $T_c$ ($k_{min,FR2,center}$=0) for the center range of the reference quantities,
     16 $T_c$ ($k_{min,FR2,edge}$=4) for the edge ranges of the reference quantities.

Table 2 proposes reported relative quantities that can be reported together with reference quantities from the center range and the edges of Table 1. The detailed list of applicable k values in Table 2 is in Annex B.

5. Observation: the network may not always have enough information to request a reasonable parameter k (suggested in [2]), e.g., it knows which k-values are applicable for FR1 and FR2 but it may not know whether the measured RSTD is large (falls in one of the edge parts of Table 1 where, for example, 1 $T_c$ resolution does not make sense) or not.
6. Proposal 5: The UE shall use the recommended by the network k-value if the k-value is applicable for the measured RSTD to be reported, otherwise the UE shall choose, e.g., the applicable k' closest to k.

TABLE 1

Reported reference quantities for PRS RSTD in NR

| Reported Reference Quantity Value | Measured Quantity Value | Unit |
|---|---|---|
| RSTD_0000 | −15391 > RSTD | $T_s$ |
| RSTD_0001 | −15391 ≤ RSTD < −15386 | $T_s$ |
| ... | ... | ... |
| RSTD_2258 | −4106 ≤ RSTD < −4101 | $T_s$ |
| RSTD_2259 | −4101 ≤ RSTD < −4096 | $T_s$ |
| RSTD_2260 | −4096 ≤ RSTD < −4095 | $T_s$ |
| RSTD_2261 | −4095 ≤ RSTD < −4094 | $T_s$ |
| ... | ... | ... |
| RSTD_6353 | −3 ≤ RSTD < −2 | $T_s$ |
| RSTD_6354 | −2 ≤ RSTD < −1 | $T_s$ |
| RSTD_6355 | −1 ≤ RSTD ≤ 0 | $T_s$ |
| RSTD_6356 | 0 < RSTD ≤ 1 | $T_s$ |
| RSTD_6357 | 1 < RSTD ≤ 2 | $T_s$ |
| RSTD_6358 | 2 < RSTD ≤ 3 | $T_s$ |
| ... | ... | ... |
| RSTD_10450 | 4094 < RSTD ≤ 4095 | $T_s$ |
| RSTD_10451 | 4095 < RSTD ≤ 4096 | $T_s$ |
| RSTD_10452 | 4096 < RSTD ≤ 4101 | $T_s$ |
| RSTD_10453 | 4101 < RSTD ≤ 4106 | $T_s$ |
| ... | ... | ... |
| RSTD_12709 | 15381 < RSTD ≤ 15386 | $T_s$ |
| RSTD_12710 | 15386 < RSTD ≤ 15391 | $T_s$ |
| RSTD_12711 | 15391 < RSTD | $T_s$ |

TABLE 2

Reported relative quantities for PRS RSTD in NR

| Reported Relative Quantity Value | Measured Relative Quantity Value, $\Delta_{RSTD}$ | Unit |
|---|---|---|
| RSTD_delta_0 | 0 | $T_c$ |
| RSTD_delta_1 | 1 | $T_c$ |
| RSTD_delta_2 | 2 | $T_c$ |
| ... | ... | ... |
| RSTD_delta_63 | 63 | $T_c$ |
| RSTD_delta_64 | 64 | $T_c$ |
| RSTD_delta_65 | 80 | $T_c$ |
| RSTD_delta_66 | 96 | $T_c$ |
| RSTD_delta_67 | 112 | $T_c$ |
| RSTD_delta_68 | 128 | $T_c$ |
| RSTD_delta_69 | 144 | $T_c$ |
| RSTD_delta_70 | 160 | $T_c$ |
| RSTD_delta_71 | 176 | $T_c$ |
| RSTD_delta_72 | 192 | $T_c$ |
| RSTD_delta_73 | 208 | $T_c$ |
| RSTD_delta_74 | 224 | $T_c$ |
| RSTD_delta_75 | 240 | $T_c$ |
| RSTD_delta_76 | 256 | $T_c$ |
| RSTD_delta_77 | 272 | $T_c$ |
| RSTD_delta_78 | 288 | $T_c$ |
| RSTD_delta_79 | 304 | $T_c$ |

NOTE:
For RSTD_delta_i the applicable k is any k in $[k_{min}, k_{max}]$ satisfying $\mod(\Delta_{RSTD}, 2^k)==0$, where
$k_{max}$=5,
$k_{min}$ in FR1: $k_{min,FR1,center}$=4, $k_{min,FR1,edge}$=5,
$k_{min}$ in FR2: $k_{min,FR1,center}$=0, $k_{min,FR1,edge}$=4.

3. Summary

The following have been proposed in this Appendix.

Proposal 1: Reuse LTE approach, where the UE reports a reference quantity rstd and a relative quantity $\Delta_{RSTD}$.

Proposal 2: The reportable reference quantities are the same as Table 9.1.10.3-1 from TS 36.133.

Proposal 3: The maximum step in Table 2 is 32 $T_c$ ($k_{max}$=5) for both center and edge ranges of the reference quantities, which corresponds to 0.5 $T_s$ in LTE, both FR1 and FR2.

Proposal 4: The minimum step in Table 2 is:

In FR1:
- 16 $T_c$ ($k_{min,FR1,center}$=4) for the center range of the reference quantities, which corresponds to 0.25 $T_s$ in LTE,
- 32 $T_c$ ($k_{min,FR1,edge}$=5) for the edge ranges of the reference quantities, which corresponds to 0.5 $T_s$ in LTE.

In FR2:
- 1 $T_c$ ($k_{min,FR2,center}$=0) for the center range of the reference quantities,
- 16 $T_c$ ($k_{min,FR2,edge}$=4) for the edge ranges of the reference quantities.

Observation: the network may not always have enough information to request a reasonable parameter k (suggested in [2]), e.g., it knows which k-values are applicable for FR1 and FR2 but it may not know whether the measured RSTD is large (falls in one of the edge parts of Table 1 where, for example, 1 $T_c$ resolution does not make sense) or not.

Proposal 5: The UE shall use the recommended by the network k-value if the k-value is applicable for the measured RSTD to be reported, otherwise the UE shall choose, e.g., the applicable k' closest to k.

Based on the above proposals a draft CR is provided in [3].

4. References

[1] R4-1915854, Way forward on NR Positioning RRM, Ericsson, November 2019.
[2] R1-1913522, RAN1 LS on agreements related to NR Positioning, November 2019.
[3] R4-20xxx, Draft CR to 38.133, Measurement report mapping for PRS RSTD, February 2020.

5. Annex A: LTE RSTD Measurement Report Mapping (TS 36.133)

9.1.10.3 RSTD Measurement Report Mapping

The reporting range of RSTD is defined from −15391 $T_s$ to 15391 $T_s$ with 1 $T_s$ resolution for absolute value of RSTD less or equal to 4096 $T_s$ and 5 $T_s$ for absolute value of RSTD greater than 4096 $T_s$.

The mapping of measured quantity is defined in Table 9.1.10.3-1.

TABLE 9.1.10.3-1

| RSTD report mapping | | |
|---|---|---|
| Reported Value | Measured Quantity Value | Unit |
| RSTD_0000 | −15391 > RSTD | $T_s$ |
| RSTD_0001 | −15391 ≤ RSTD < −15386 | $T_s$ |
| ... | ... | ... |
| RSTD_2258 | −4106 ≤ RSTD < −4101 | $T_s$ |
| RSTD_2259 | −4101 ≤ RSTD < −4096 | $T_s$ |
| RSTD_2260 | −4096 ≤ RSTD < −4095 | $T_s$ |
| RSTD_2261 | −4095 ≤ RSTD < −4094 | $T_s$ |
| ... | ... | ... |
| RSTD_6353 | −3 ≤ RSTD < −2 | $T_s$ |
| RSTD_6354 | −2 ≤ RSTD < −1 | $T_s$ |
| RSTD_6355 | −1 ≤ RSTD ≤ 0 | $T_s$ |
| RSTD_6356 | 0 < RSTD ≤ 1 | $T_s$ |
| RSTD_6357 | 1 < RSTD ≤ 2 | $T_s$ |
| RSTD_6358 | 2 < RSTD ≤ 3 | $T_s$ |
| ... | ... | ... |

TABLE 9.1.10.3-1-continued

| RSTD report mapping | | |
|---|---|---|
| Reported Value | Measured Quantity Value | Unit |
| RSTD_10450 | 4094 < RSTD ≤ 4095 | $T_s$ |
| RSTD_10451 | 4095 < RSTD ≤ 4096 | $T_s$ |
| RSTD_10452 | 4096 < RSTD ≤ 4101 | $T_s$ |
| RSTD_10453 | 4101 < RSTD ≤ 4106 | $T_s$ |
| ... | ... | ... |
| RSTD_12709 | 15381 < RSTD ≤ 15386 | $T_s$ |
| RSTD_12710 | 15386 < RSTD ≤ 15391 | $T_s$ |
| RSTD_12711 | 15391 < RSTD | $T_s$ |

9.1.10.4 Higher-Resolution RSTD Measurement Report Mapping

The reporting range of higher-resolution RSTD is defined from −15391 $T_s$ to 15391 $T_s$ with 0.5 $T_s$ resolution.

The UE shall report a reference quantity based on Table 9.1.10.3-1 and a relative quantity $\Delta_{RSTD}$ defined in Table 9.1.10.4-1, so that the difference between the measured RSTD quantity and the lower bound of the corresponding range from Table 9.1.10.3-1 is between $\Delta_{RSTD}$ and $\Delta_{RSTD}$+ resolutionStep.

RSTD_delta_0 or RSTD_delta_1 specified in Table 9.1.10.4-1 can be reported together with any value from Table 9.1.10.3-1 in the range from RSTD_2260 to RSTD_10451. In this case, resolutionStep is 0.5.

Any relative quantity value from Table 9.1.10.4-1, except RSTD_delta_1, can be reported together with any value from Table 9.1.10.3-1 in the range from RSTD_0000 to RSTD_2259 or in the range from RSTD_10452 to RSTD_12711. In this case, resolutionStep is 1.0.

TABLE 9.1.10.4-1

| Relative quantity mapping for higher-resolution RSTD measurement reporting | | |
|---|---|---|
| Reported Relative Quantity Value | Measured Relative Quantity Value, $\Delta_{RSTD}$ | Unit |
| RSTD_delta_0 | 0 | $T_s$ |
| RSTD_delta_1 | 0.5 | $T_s$ |
| RSTD_delta_2 | 1.0 | $T_s$ |
| RSTD_delta_3 | 2.0 | $T_s$ |
| RSTD_delta_4 | 3.0 | $T_s$ |
| RSTD_delta_5 | 4.0 | $T_s$ |

6. Annex B: Detailed List of Applicable k-Values

Column Labels:
- Col. 1—When RSTD_delta_i is reported together with RSTD_2260 . . . RSTD_10451
- Col. 2—When RSTD_delta_i is reported together with RSTD_0000 . . . RSTD_2259 or RSTD_10452 . . . RSTD_12711
- Col. 3—When RSTD_delta_i is reported together with RSTD_2260 . . . RSTD_10451
- Col. 4—When RSTD_delta_i is reported together with RSTD_0000 . . . RSTD_2259 or RSTD_10452 . . . RSTD_12711

| Reported Relative Quantity Value | Measured Relative Quantity Value, $\Delta_{RSTD}$ | Unit | Applicable k (any k in $[k_{min}, k_{max}]$ satisfying $\mod(\Delta_{RSTD}, 2^k) == 0$) | | | |
|---|---|---|---|---|---|---|
| | | | FR1 | | FR2 | |
| | | | Col. 1 | Col. 2 | Col. 3 | Col. 4 |
| RSTD_delta_0 | 0 | $T_c$ | 4, 5 | 5 | 0, 1, 2, 3, 4, 5 | 4, 5 |
| RSTD_delta_1 | 1 | $T_c$ | — | — | 0 | — |
| RSTD_delta_2 | 2 | $T_c$ | — | — | 0, 1 | — |
| RSTD_delta_3 | 3 | $T_c$ | — | — | 0 | — |
| RSTD_delta_4 | 4 | $T_c$ | — | — | 0, 1, 2 | — |
| RSTD_delta_5 | 5 | $T_c$ | — | — | 0 | — |
| RSTD_delta_6 | 6 | $T_c$ | — | — | 0, 1 | — |
| RSTD_delta_7 | 7 | $T_c$ | — | — | 0 | — |
| RSTD_delta_8 | 8 | $T_c$ | — | — | 0, 1, 2, 3 | — |
| RSTD_delta_9 | 9 | $T_c$ | — | — | 0 | — |
| RSTD_delta_10 | 10 | $T_c$ | — | — | 0, 1 | — |
| RSTD_delta_11 | 11 | $T_c$ | — | — | 0 | — |
| RSTD_delta_12 | 12 | $T_c$ | — | — | 0, 1, 2 | — |
| RSTD_delta_13 | 13 | $T_c$ | — | — | 0 | — |
| RSTD_delta_14 | 14 | $T_c$ | — | — | 0, 1 | — |
| RSTD_delta_15 | 15 | $T_c$ | — | — | 0 | — |
| RSTD_delta_16 | 16 | $T_c$ | 4 | — | 0, 1, 2, 3, 4 | 4 |
| RSTD_delta_17 | 17 | $T_c$ | — | — | 0 | — |
| RSTD_delta_18 | 18 | $T_c$ | — | — | 0, 1 | — |
| RSTD_delta_19 | 19 | $T_c$ | — | — | 0 | — |
| RSTD_delta_20 | 20 | $T_c$ | — | — | 0, 1, 2 | — |
| RSTD_delta_21 | 21 | $T_c$ | — | — | 0 | — |
| RSTD_delta_22 | 22 | $T_c$ | — | — | 0, 1 | — |
| RSTD_delta_23 | 23 | $T_c$ | — | — | 0 | — |
| RSTD_delta_24 | 24 | $T_c$ | — | — | 0, 1, 2, 3 | — |
| RSTD_delta_25 | 25 | $T_c$ | — | — | 0 | — |
| RSTD_delta_26 | 26 | $T_c$ | — | — | 0, 1 | — |
| RSTD_delta_27 | 27 | $T_c$ | — | — | 0 | — |
| RSTD_delta_28 | 28 | $T_c$ | — | — | 0, 1, 2 | — |
| RSTD_delta_29 | 29 | $T_c$ | — | — | 0 | — |
| RSTD_delta_30 | 30 | $T_c$ | — | — | 0, 1 | — |
| RSTD_delta_31 | 31 | $T_c$ | — | — | 0 | — |
| RSTD_delta_32 | 32 | $T_c$ | 4, 5 | 5 | 0, 1, 2, 3, 4, 5 | 4, 5 |
| RSTD_delta_33 | 33 | $T_c$ | — | — | 0 | — |
| RSTD_delta_34 | 34 | $T_c$ | — | — | 0, 1 | — |
| RSTD_delta_35 | 35 | $T_c$ | — | — | 0 | — |
| RSTD_delta_36 | 36 | $T_c$ | — | — | 0, 1, 2 | — |
| RSTD_delta_37 | 37 | $T_c$ | — | — | 0 | — |
| RSTD_delta_38 | 38 | $T_c$ | — | — | 0, 1 | — |
| RSTD_delta_39 | 39 | $T_c$ | — | — | 0 | — |
| RSTD_delta_40 | 40 | $T_c$ | — | — | 0, 1, 2, 3 | — |
| RSTD_delta_41 | 41 | $T_c$ | — | — | 0 | — |
| RSTD_delta_42 | 42 | $T_c$ | — | — | 0, 1 | — |
| RSTD_delta_43 | 43 | $T_c$ | — | — | 0 | — |
| RSTD_delta_44 | 44 | $T_c$ | — | — | 0, 1, 2 | — |
| RSTD_delta_45 | 45 | $T_c$ | — | — | 0 | — |
| RSTD_delta_46 | 46 | $T_c$ | — | — | 0, 1 | — |
| RSTD_delta_47 | 47 | $T_c$ | — | — | 0 | — |
| RSTD_delta_48 | 48 | $T_c$ | 4 | — | 0, 1, 2, 3, 4 | 4 |
| RSTD_delta_49 | 49 | $T_c$ | — | — | 0 | — |
| RSTD_delta_50 | 50 | $T_c$ | — | — | 0, 1 | — |
| RSTD_delta_51 | 51 | $T_c$ | — | — | 0 | — |
| RSTD_delta_52 | 52 | $T_c$ | — | — | 0, 1, 2 | — |
| RSTD_delta_53 | 53 | $T_c$ | — | — | 0 | — |
| RSTD_delta_54 | 54 | $T_c$ | — | — | 0, 1 | — |
| RSTD_delta_55 | 55 | $T_c$ | — | — | 0 | — |
| RSTD_delta_56 | 56 | $T_c$ | — | — | 0, 1, 2, 3 | — |
| RSTD_delta_57 | 57 | $T_c$ | — | — | 0 | — |
| RSTD_delta_58 | 58 | $T_c$ | — | — | 0, 1 | — |
| RSTD_delta_59 | 59 | $T_c$ | — | — | 0 | — |
| RSTD_delta_60 | 60 | $T_c$ | — | — | 0, 1, 2 | — |
| RSTD_delta_61 | 61 | $T_c$ | — | — | 0 | — |
| RSTD_delta_62 | 62 | $T_c$ | — | — | 0, 1 | — |
| RSTD_delta_63 | 63 | $T_c$ | — | — | 0 | — |
| RSTD_delta_64 | 64 | $T_c$ | — | 5 | — | 4, 5 |
| RSTD_delta_65 | 80 | $T_c$ | — | — | — | 4 |
| RSTD_delta_66 | 96 | $T_c$ | — | 5 | — | 4, 5 |
| RSTD_delta_67 | 112 | $T_c$ | — | — | — | 4 |
| RSTD_delta_68 | 128 | $T_c$ | — | 5 | — | 4, 5 |
| RSTD_delta_69 | 144 | $T_c$ | — | — | — | 4 |
| RSTD_delta_70 | 160 | $T_c$ | — | 5 | — | 4, 5 |
| RSTD_delta_71 | 176 | $T_c$ | — | — | — | 4 |
| RSTD_delta_72 | 192 | $T_c$ | — | 5 | — | 4, 5 |
| RSTD_delta_73 | 208 | $T_c$ | — | — | — | 4 |
| RSTD_delta_74 | 224 | $T_c$ | — | 5 | — | 4, 5 |
| RSTD_delta_75 | 240 | $T_c$ | — | — | — | 4 |
| RSTD_delta_76 | 256 | $T_c$ | — | 5 | — | 4, 5 |
| RSTD_delta_77 | 272 | $T_c$ | — | — | — | 4 |
| RSTD_delta_78 | 288 | $T_c$ | — | 5 | — | 4, 5 |
| RSTD_delta_79 | 304 | $T_c$ | — | — | — | 4 |

3GPP TSG-RAN WG4 Meeting #94 R4-20xxxx
Athens, Greece, 24-28 Feb. 2020
 Title: [DRAFT] LS on UE measurement report mapping for UE positioning measurements in NR
 Release: Rel-16
 Work Item: NR_POS-Core
 Source: 3GPP TSG-RAN WG4
 To: 3GPP TSG-RAN WG2

1. 1. Overall Description

RAN4 has discussed and made the following agreements related to the measurement report mapping for UE positioning measurements in NR.

For RSTD:

RAN4 will define RSTD measurement report mapping with 12712 reported reference values and 80 reported relative values.

The same two-level approach is used as in LTE. To report an RSTD measurement, the UE shall report a reference quantity value based on one table (to be specified by RAN4 in TS 38.133) and a relative quantity value $\Delta_{RSTD}$ defined in another table to be specified by RAN4 in TS 38.133), so that the difference between the measured RSTD quantity and the lower bound of the corresponding range from the first table is between $\Delta_{RSTD}$ and $\Delta_{RSTD}$+resolutionStep. The resolutionStep is $2^k$, where k (k=0, 1, 2, 3, 4, or 5) is the resolution factor which shall meet the RAN4 conditions.

For PRS-RSRP:

RAN4 will define PRS-RSRP measurement report mapping with 128 reported values.

RAN4 will define differential PRS-RSRP measurement report mapping with 31 reported values.

For UE Rx-Tx:

In FR1, for UE Rx-Tx measured only on the serving cell, the largest number of reportable values (for k=3) shall be 8189.

In FR2, for UE Rx-Tx measured only on the serving cell, the largest number of reportable values (for k=0) shall be 131041.

In FR1, for UE Rx-Tx measured on the serving cell and neighbour cells (multi-RTT), the largest number of reportable values (for k=3) shall be 21535.

In FR2, for UE Rx-Tx measured on the serving cell and neighbour cells (multi-RTT), the largest number of reportable values (for k=0) shall be 172273.

RAN4 further observed that:
In FR1 the UE shall signal the information about the $N_{TA\_offset}$ used for deriving the reported value when reporting UE Rx-Tx measurement value to the positioning node The UE shall signal the granularity parameter (k) used for deriving the reported value when reporting UE Rx-Tx measurement value to gNB

2. Actions

To RAN2 group:
ACTION: RAN4 kindly asks RAN2 to take the above information into account in their work related to NR positioning.

3. Date of Next TSG-RAN WG4 Meetings

| | |
|---|---|
| TSG-RAN WG4 Meeting #94-Bis | 20-24 Apr. 2020 |
| TSG-RAN WG4 Meeting #95 | 25-29 May 2020 |

3GPP TSG-RAN WG4 Meeting #94-e R4-20xxxx
Electronic Meeting, Feb. 24-Mar. 6, 2020

| |
|---|
| CR-Form-v12.0 |
| CHANGE REQUEST |
| 38.133 CR xxxx rev - Current version: 16.2.0 |

10.1.X1 DL RSTD measurement accuracy requirements
10.1.X2 DL RSTD measurement report mapping To report an RSTD measurement, the UE shall report a reference quantity value based on Table 10.1.X2-1 and a relative quantity value $\Delta_{RSTD}$ defined in Table 10.1.X2-2, so that the difference between the measured RSTD quantity and the lower bound of the corresponding range from Table 10.1.X2-1 is between $\Delta_{RSTD}$ and $\Delta_{RSTD}$+resolutionStep. The resolutionStep is $2^k$, where k shall be an applicable value satisfying $k_{min} \leq k \leq k_{max}$ and $mod(\Delta_{RSTD}, 2^k)=0$, with $k_{max}=5$, $k_{min}=4$ for FR1 when RSTD_delta_i is reported together with a reference quantity from RSTD_2260 to RSTD_10451, $k_{min}=5$ for FR1 when RSTD_delta_i is reported together with a reference quantity from RSTD_0000 to RSTD_2259 or from RSTD_10452 to RSTD_12711, $k_{min}=0$ for FR2 when RSTD_delta_i is reported together with a reference quantity from RSTD_2260 to RSTD_10451, $k_{min}=4$ for FR2 when RSTD_delta_i is reported together with a reference quantity from RSTD_0000 to RSTD_2259 or from RSTD_10452 to RSTD_12711.

If the value of k is configured by LMF but it is not an applicable value for the current RSTD measurement to be reported, the UE determines the resolutionStep for reporting the RSTD measurement based on the applicable k-value which is closest to the configured k, otherwise the UE uses the configured k to determine resolutionStep.

FFS when the value of k is not configured.

The mapping between the measured quantity and the reported reference quantity values is defined in Table 10.1.X2-1. The reporting range of the reference RSTD is defined from $-15391\ T_s$ to $15391\ T_s$ with 1 $T_s$ resolution for absolute value of RSTD less or equal to 4096 $T_s$ and 5 $T_s$ for absolute value of RSTD greater than 4096 $T_s$, where $T_s$ is defined in TS 38.211 [6].

TABLE 10.1.X2-1

Reference quantity report mapping

| Reported Reference Quantity Value | Measured Quantity Value | Unit |
|---|---|---|
| RSTD_0000 | −15391 > RSTD | $T_s$ |
| RSTD_0001 | −15391 ≤ RSTD < −15386 | $T_s$ |
| ... | ... | ... |
| RSTD_2258 | −4106 ≤ RSTD < −4101 | $T_s$ |
| RSTD_2259 | −4101 ≤ RSTD < −4096 | $T_s$ |
| RSTD_2260 | −4096 ≤ RSTD < −4095 | $T_s$ |
| RSTD_2261 | −4095 ≤ RSTD < −4094 | $T_s$ |
| ... | ... | ... |
| RSTD_6353 | −3 ≤ RSTD < −2 | $T_s$ |
| RSTD_6354 | −2 ≤ RSTD < −1 | $T_s$ |
| RSTD_6355 | −1 ≤ RSTD ≤ 0 | $T_s$ |
| RSTD_6356 | 0 < RSTD ≤ 1 | $T_s$ |
| RSTD_6357 | 1 < RSTD ≤ 2 | $T_s$ |
| RSTD_6358 | 2 < RSTD ≤ 3 | $T_s$ |
| ... | ... | ... |
| RSTD_10450 | 4094 < RSTD ≤ 4095 | $T_s$ |
| RSTD_10451 | 4095 < RSTD ≤ 4096 | $T_s$ |
| RSTD_10452 | 4096 < RSTD ≤ 4101 | $T_s$ |
| RSTD_10453 | 4101 < RSTD ≤ 4106 | $T_s$ |
| ... | ... | ... |
| RSTD_12709 | 15381 < RSTD ≤ 15386 | $T_s$ |
| RSTD_12710 | 15386 < RSTD ≤ 15391 | $T_s$ |
| RSTD_12711 | 15391 < RSTD | $T_s$ |

The mapping between the measured relative quantity and the reported relative quantity values is defined in Table 10.1.X2-2.

TABLE 10.1.X2-2

Relative quantity report mapping

| Reported Relative Quantity Value | Measured Relative Quantity Value, $\Delta_{RSTD}$ | Unit |
|---|---|---|
| RSTD_delta_0 | 0 | $T_c$ |
| RSTD_delta_1 | 1 | $T_c$ |
| RSTD_delta_2 | 2 | $T_c$ |
| ... | ... | ... |
| RSTD_delta_63 | 63 | $T_c$ |
| RSTD_delta_64 | 64 | $T_c$ |
| RSTD_delta_65 | 80 | $T_c$ |
| RSTD_delta_66 | 96 | $T_c$ |
| RSTD_delta_67 | 112 | $T_c$ |
| RSTD_delta_68 | 128 | $T_c$ |
| RSTD_delta_69 | 144 | $T_c$ |
| RSTD_delta_70 | 160 | $T_c$ |
| RSTD_delta_71 | 176 | $T_c$ |
| RSTD_delta_72 | 192 | $T_c$ |
| RSTD_delta_73 | 208 | $T_c$ |
| RSTD_delta_74 | 224 | $T_c$ |
| RSTD_delta_75 | 240 | $T_c$ |
| RSTD_delta_76 | 256 | $T_c$ |
| RSTD_delta_77 | 272 | $T_c$ |
| RSTD_delta_78 | 288 | $T_c$ |
| RSTD_delta_79 | 304 | $T_c$ |

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the following claims.

The invention claimed is:

1. A method for use in a first node configured as a measuring node, the method comprising:
   receiving a first resolution factor (k) from a second node;
   adapting the first resolution factor (k) to obtain a second resolution factor (k'), wherein adapting the first resolution factor (k) comprises:
      determining a set of applicable values, wherein determining the set of applicable values is based on a function that depends at least in part on a frequency range (FR) in which the measurement is performed, and each applicable value of the set of applicable values belongs to a range of values indicated by the function, and wherein:
         for the measurement performed in a frequency range 1 (FR1), the range of values indicated by the function has a minimum value for frequency range 1 $[k_{min}, FR1]$ and a maximum value for frequency range 1 $[k_{max}, FR1]$; and
         for the measurement performed in a frequency range 2 (FR2), the range of values indicated by the function has a minimum value for frequency range 2 $[k_{min}, FR2]$ and a maximum value for frequency range 2 $[k_{max}, FR2]$; and
      selecting an applicable value from the set of applicable values as the second resolution factor (k'); and
   reporting a measurement to the second node according to the second resolution factor (k').

2. The method of claim 1, further comprising:
   indicating the second resolution factor (k') to the second node.

3. The method of claim 2, wherein the indicating comprises implicitly indicating the second resolution factor (k') to the second node.

4. The method of claim 1, wherein the first resolution factor (k) indicates a reporting granularity for timing measurements.

5. A first node, the first node configured as a measuring node, the first node comprising:
   power supply circuitry configured to supply power to the first node; and
   processing circuitry configured to:
      receive a first resolution factor (k) from a second node;
      adapt the first resolution factor (k) to obtain a second resolution factor (k'), wherein to adapt the first resolution factor (k), the processing circuitry is configured to:
         determine a set of applicable values, wherein the processing circuitry is configured to determine the set of applicable values based on a function that depends at least in part on a frequency range (FR) in which the measurement is performed, and each applicable value of the set of applicable values belongs to a range of values indicated by the function, and wherein:
            for the measurement performed in a frequency range 1 (FR1), the range of values indicated by the function has a minimum value for frequency range 1 $[k_{min}, FR1]$ and a maximum value for frequency range 1 $[k_{max}, FR1]$; and
            for the measurement performed in a frequency range 2 (FR2), the range of values indicated by the function has a minimum value for frequency range 2 $[k_{min}, FR2]$ and a maximum value for frequency range 2 $[k_{max}, FR2]$; and
         select an applicable value from the set of applicable values as the second resolution factor (k'); and
      report a measurement to the second node according to the second resolution factor (k').

6. The first node of claim 5, the processing circuitry further configured to:
   indicate the second resolution factor (k') to the second node.

7. The first node of claim 6, wherein the processing circuitry is configured to implicitly indicate the second resolution factor (k') to the second node.

8. The first node of claim 5, wherein the first resolution factor (k) indicates a reporting granularity for timing measurements.

9. The first node of claim 5, wherein the selected applicable value is closest to the first resolution factor (k) out of those of the set of applicable values that are less than the first resolution factor (k).

10. The first node of claim 5, wherein the selected applicable value is closest to the first resolution factor (k) out of those of the set of applicable values that are greater than the first resolution factor (k).

11. The first node of claim 5, wherein to determine the set of applicable values, the processing circuitry is further configured to:
    determine the set of applicable values based on a function that depends at least in part on a measured value.

12. The first node of claim 11, wherein the function further depends on one or more of:
    a frequency range (FR) in which the measurement is performed;
    a reference quantity;
    a measurement purpose;
    whether a cell in which the measurement is performed is a serving cell or a non-serving cell; and/or
    a positioning method.

13. The first node of claim 11, wherein the function indicates a range having a minimum value $[k_{min}]$ and a maximum value $[k_{max}]$ and each applicable value of the set of applicable values belongs to the range indicated by the function.

14. A method for use in a second node, the method comprising:
    sending a first resolution factor (k) to a first node; and
    receiving a measurement from the first node according to a second resolution factor (k') obtained by the first node by adapting the first resolution factor (k), wherein the second resolution factor (k') corresponds to a value that the first node selected from a set of applicable values, wherein the set of applicable values is based on a function that depends at least in part on a frequency range (FR) in which the measurement is performed, and each applicable value of the set of applicable values belongs to a range of values indicated by the function, and wherein:

for the measurement performed in a frequency range 1 (FR1), the range of values indicated by the function has a minimum value for frequency range 1 [$k_{min}$, FR1] and a maximum value for frequency range 1 [$k_{max}$, FR1]; and for the measurement performed in a frequency range 2 (FR2), the range of values indicated by the function has a minimum value for frequency range 2 [$k_{min}$, FR2] and a maximum value for frequency range 2 [$k_{max}$, FR2], and wherein the set of applicable values is determined by the first node.

15. A second node, the second node comprising:
power supply circuitry configured to supply power to the second node; and
processing circuitry configured to:
send a first resolution factor (k) to a first node; and
receive a measurement from the first node according to a second resolution factor (k') obtained by the first node by adapting the first resolution factor (k), wherein the second resolution factor (k') corresponds to a value that the first node selected from a set of applicable values, wherein the set of applicable values is based on a function that depends at least in part on a frequency range (FR) in which the measurement is performed, and each applicable value of the set of applicable values belongs to a range of values indicated by the function, and wherein:

for the measurement performed in a frequency range 1 (FR1), the range of values indicated by the function has a minimum value for frequency range 1 [$k_{min}$, FR1] and a maximum value for frequency range 1 [$k_{max}$, FR1]; and for the measurement performed in a frequency range 2 (FR2), the range of values indicated by the function has a minimum value for frequency range 2 [$k_{min}$, FR2] and a maximum value for frequency range 2 [$k_{max}$, FR2], and wherein the set of applicable values is determined by the first node.

16. The second node of claim 15, the processing circuitry further configured to:
receive an indication of the second resolution factor (k') from the first node.

17. The second node of claim 16, wherein the indication is implicitly received.

18. The second node of claim 15, wherein the first resolution factor (k) indicates a reporting granularity for timing measurements.

19. The second node of claim 15, wherein the selected applicable value is closest to the first resolution factor (k) out of those of the set of applicable values that are less than the first resolution factor (k).

20. The second node of claim 15, wherein the selected applicable value is closest to the first resolution factor (k) out of those of the set of applicable values that are greater than the first resolution factor (k).

21. The second node of claim 15, wherein the second resolution factor (k') corresponds to a value that the first node selected from a set of applicable values, the set of applicable values based on a function that depends at least in part on a measured value determined by the first node.

22. The second node of claim 21, wherein the function further depends on one or more of:
a frequency range (FR) in which the measurement is performed;
a reference quantity;
a measurement purpose;
whether a cell in which the measurement is performed is a serving cell or a non-serving cell; and/or
a positioning method.

23. The second node of claim 21, wherein the function indicates a range having a minimum value [$k_{min}$] and a maximum value [$k_{max}$] and each applicable value of the set of applicable values belongs to the range indicated by the function.

* * * * *